US012632254B2

(12) United States Patent
Jain et al.

(10) Patent No.: US 12,632,254 B2
(45) Date of Patent: May 19, 2026

(54) SIMULATING NETWORK FLOW CONTROL

(71) Applicant: Intel Corporation, Santa Clara, CA (US)

(72) Inventors: Samkit Jain, Hillsboro, OR (US); Izajasz Piotr Wrosz, Banino (PL); Nicholas M. Pepperling, Portland, OR (US); Joshua B. Fryman, Corvallis, OR (US); Balasubramanian Seshasayee, Hillsboro, OR (US); Ibrahim Hur, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 17/711,502

(22) Filed: Apr. 1, 2022

(65) Prior Publication Data

US 2022/0224605 A1 Jul. 14, 2022

Related U.S. Application Data

(60) Provisional application No. 63/295,280, filed on Dec. 30, 2021, provisional application No. 63/293,590, filed on Dec. 23, 2021.

(51) Int. Cl.
G06F 9/30 (2018.01)
G06F 9/345 (2018.01)
(Continued)

(52) U.S. Cl.
CPC ........ G06F 9/3004 (2013.01); G06F 9/30003 (2013.01); G06F 9/30007 (2013.01);
(Continued)

(58) Field of Classification Search
CPC .. G06F 9/3004; G06F 9/3001; G06F 9/30145; G06F 9/3851; G06F 11/1044;
(Continued)

(56) References Cited

U.S. PATENT DOCUMENTS 10,007,549 B2 6/2018 Gottschlich et al.
10,409,763 B2 9/2019 Lai et al.
(Continued)

OTHER PUBLICATIONS

PCT International Search Report and Written Opinion issued in PCT/US2022/022886, dated Nov. 18, 2022; 13 pages.
(Continued)

*Primary Examiner* — Tonia L Dollinger
(74) *Attorney, Agent, or Firm* — Alliance IP, LLC

(57) ABSTRACT

A system simulator simulates operations of a plurality of interconnected devices in a simulation of a computing system. The system simulator implements a communication runtime in the simulation to receive a packet generated by a simulation of a first one of the plurality of devices to be sent to a simulation of a second one of the plurality of devices in the simulation. The communication runtime buffers the packet in its internal buffer and receives a query from the simulation of the second device based on buffer capacity in the simulation of the second device has capacity. The packet is sent from the communication runtime buffer to the simulation of the second device based on the query to simulate transmission of the packet from the first device to the second device on a link.

20 Claims, 24 Drawing Sheets

1100

(51) Int. Cl.

| | |
|---|---|
| *G06F 9/38* | (2018.01) |
| *G06F 11/10* | (2006.01) |
| *G06F 12/02* | (2006.01) |
| *G06F 12/1081* | (2016.01) |
| *G06F 13/28* | (2006.01) |
| *H04L 41/14* | (2022.01) |
| *H04L 43/045* | (2022.01) |
| *H04L 43/062* | (2022.01) |
| *H04L 49/00* | (2022.01) |
| *H04L 49/9047* | (2022.01) |

(52) U.S. Cl.

CPC ........ *G06F 9/3001* (2013.01); *G06F 9/30029* (2013.01); *G06F 9/30032* (2013.01); *G06F 9/30043* (2013.01); *G06F 9/3455* (2013.01); *G06F 9/3851* (2013.01); *G06F 9/3877* (2013.01); *G06F 11/1044* (2013.01); *G06F 12/0238* (2013.01); *G06F 12/1081* (2013.01); *G06F 13/28* (2013.01); *H04L 41/145* (2013.01); *H04L 43/045* (2013.01); *H04L 43/062* (2013.01); *H04L 49/3063* (2013.01); *H04L 49/9047* (2013.01); *G06F 2213/28* (2013.01)

(58) Field of Classification Search

CPC ............. G06F 12/0238; G06F 12/1081; G06F 9/30189; G06F 9/355; G06F 12/0284; G06F 2212/6026; G06F 9/5027; G06F 13/28; G06F 9/3867; H04L 41/145; H04L 43/045; H04L 43/062; H04L 49/3063; H04L 49/9047; H04L 49/501

See application file for complete search history.

(56) References Cited

U.S. PATENT DOCUMENTS

| | | | |
|---|---|---|---|
| 10,768,997 | B2 | 9/2020 | Agarwal et al. |
| 11,080,046 | B2 | 8/2021 | Kaul et al. |
| 2011/0302559 | A1 | 12/2011 | Naik |
| 2015/0063350 | A1* | 3/2015 | Sundaram ............... H04L 45/74 |
| | | | 370/389 |
| 2018/0018199 | A1 | 1/2018 | Innes et al. |
| 2019/0278639 | A1 | 9/2019 | Colmone et al. |
| 2020/0053026 | A1* | 2/2020 | Rangachari ............. H04L 45/44 |
| 2020/0319914 | A1 | 10/2020 | Wu et al. |
| 2020/0409709 | A1 | 12/2020 | ChoFleming et al. |
| 2021/0055934 | A1 | 2/2021 | Sodani et al. |

OTHER PUBLICATIONS

Dang, Hoang-Vu, et al., "A Lightweight Communication Runtime for Distributed Graph Analytics," 2018 IEEE International Parallel and Distributed Processing Symposium (IPDPS), 2018, pp. 980-989, doi: 10.1109/IPDPS.2018.00107.

* cited by examiner

200a

205

1) If credit != 0, A sends packet (P) to B and decrements credit by 1

2) B sends ACK to A upon receiving packet, else NACK

3) B sends a packet from its buffer to C. It then sends a credit update request to A to increment it by 1

4) A increments credit by 1 and sends ACK to B time

SIMULATING NETWORK FLOW CONTROL

RELATED APPLICATIONS

This application claims benefit to U.S. Provisional Patent Application Ser. No. 63/295,280, filed Dec. 30, 2021 and U.S. Provisional Patent Application Ser. No. 63/293,590, filed Dec. 23, 2021, both of which are incorporated by reference herein in their entirety.

STATEMENT REGARDING FEDERALLY SPONSORED RESEARCH AND DEVELOPMENT

This invention was made with Government support under Agreement No. HR0011-17-3-0004, awarded by DARPA. The Government has certain rights in the invention.

FIELD

The present disclosure relates in general to the field of computer architecture, and more specifically, to simulations of distributed computing systems.

BACKGROUND

A datacenter may include one or more platforms each including at least one processor and associated memory modules. Each platform of the datacenter may facilitate the performance of any suitable number of processes associated with various applications running on the platform. These processes may be performed by the processors and other associated logic of the platforms. Each platform may additionally include I/O controllers, such as network adapter devices, which may be used to send and receive data on a network for use by the various applications. Bit errors may arise on networks, links, and interconnect fabrics used to interconnect components in a datacenter. System simulators have been developed for use in modeling and simulating operation of computing systems and may be usefully employed in modeling and prototyping datacenter computing systems and architectures.

BRIEF DESCRIPTION OF THE DRAWINGS

Like reference numbers and designations in the various drawings indicate like elements.

DETAILED DESCRIPTION

Figure 1:
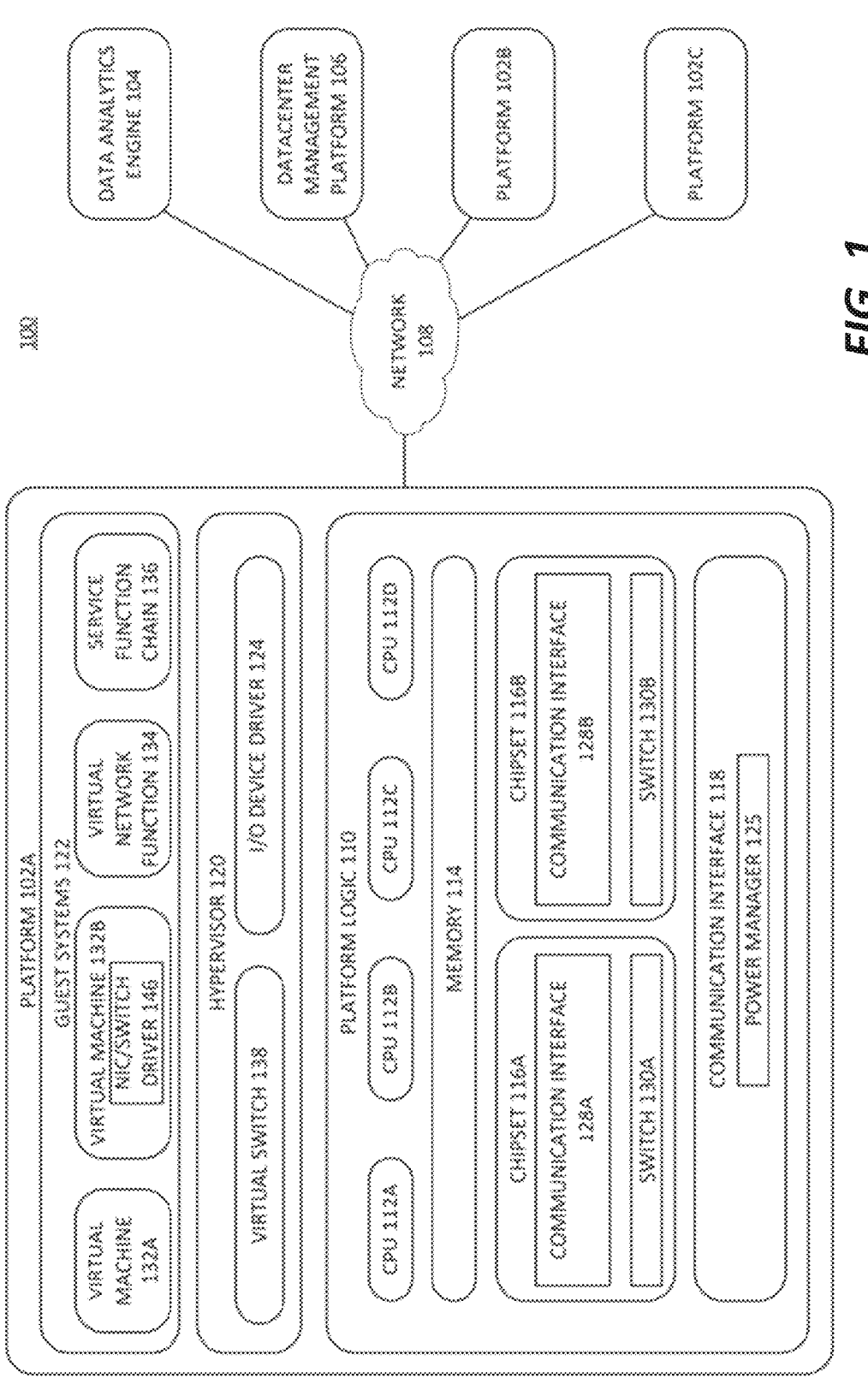
FIG. 1 illustrates a block diagram of components of an example datacenter.

FIG. 1 illustrates a block diagram of components of a datacenter 100 in accordance with certain embodiments. In the embodiment depicted, datacenter 100 includes a plurality of platforms 102 (e.g., 102A, 102B, 102C, etc.), data analytics engine 104, and datacenter management platform 106 coupled together through network 108. A platform 102 may include platform logic 110 with one or more central processing units (CPUs) 112 (e.g., 112A, 112B, 112C, 112D), memories 114 (which may include any number of different modules), chipsets 116 (e.g., 116A, 116B), communication interfaces 118, and any other suitable hardware and/or software to execute a hypervisor 120 or other operating system capable of executing processes associated with applications running on platform 102. In some embodiments, a platform 102 may function as a host platform for one or more guest systems 122 that invoke these applications.

Each platform 102 may include platform logic 110. Platform logic 110 includes, among other logic enabling the functionality of platform 102, one or more CPUs 112, memory 114, one or more chipsets 116, and communication interface 118. Although three platforms are illustrated, datacenter 100 may include any suitable number of platforms. In various embodiments, a platform 102 may reside on a circuit board that is installed in a chassis, rack, compossible servers, disaggregated servers, or other suitable structures that includes multiple platforms coupled together through network 108 (which may include, e.g., a rack or backplane switch).

CPUs 112 may each include any suitable number of processor cores. The cores may be coupled to each other, to memory 114, to at least one chipset 116, and/or to communication interface 118, through one or more controllers residing on CPU 112 and/or chipset 116. In particular embodiments, a CPU 112 is embodied within a socket that is permanently or removably coupled to platform 102. CPU 112 is described in further detail below in connection with FIG. 4. Although four CPUs are shown, a platform 102 may include any suitable number of CPUs.

Memory 114 may include any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 114 may be used for short, medium, and/or long-term storage by platform 102. Memory 114 may store any suitable data or information utilized by platform logic 110, including software embedded in a computer readable medium, and/or encoded logic incorporated in hardware or otherwise stored (e.g., firmware). Memory 114 may store data that is used by cores of CPUs 112. In some embodiments, memory 114 may also include storage for instructions that may be executed by the cores of CPUs 112 or other processing elements (e.g., logic resident on chipsets 116) to provide functionality associated with components of platform logic 110. Additionally or alternatively, chipsets 116 may each include memory that may have any of the characteristics described herein with respect to memory 114. Memory 114 may also store the results and/or intermediate results of the various calculations and determinations performed by CPUs 112 or processing elements on chipsets 116. In various embodiments, memory 114 may include one or more modules of system memory coupled to the CPUs through memory controllers (which may be external to or integrated with CPUs 112). In various embodiments, one or more particular modules of memory 114 may be dedicated to a particular CPU 112 or other processing device or may be shared across multiple CPUs 112 or other processing devices.

A platform 102 may also include one or more chipsets 116 including any suitable logic to support the operation of the CPUs 112. In some cases, chipsets 116 may be implementations of graph processing devices, such as discussed herein. In various embodiments, chipset 116 may reside on the same package as a CPU 112 or on one or more different packages. Each chipset may support any suitable number of CPUs 112. A chipset 116 may also include one or more controllers to couple other components of platform logic 110 (e.g., communication interface 118 or memory 114) to one or more CPUs. Additionally or alternatively, the CPUs 112 may include integrated controllers. For example, communication interface 118 could be coupled directly to CPUs 112 via one or more integrated I/O controllers resident on each CPU.

Chipsets 116 may each include one or more communication interfaces 128 (e.g., 128A, 128B). Communication interface 128 may be used for the communication of signaling and/or data between chipset 116 and one or more I/O devices, one or more networks 108, and/or one or more devices coupled to network 108 (e.g., datacenter management platform 106 or data analytics engine 104). For example, communication interface 128 may be used to send and receive network traffic such as data packets. In a particular embodiment, communication interface 128 may be implemented through one or more I/O controllers, such as one or more physical network interface controllers (NICs), also known as network interface cards or network adapters. An I/O controller may include electronic circuitry to communicate using any suitable physical layer and data link layer standard such as Ethernet (e.g., as defined by an IEEE 802.3 standard), Fibre Channel, InfiniBand, Wi-Fi, or other suitable standard. An I/O controller may include one or more physical ports that may couple to a cable (e.g., an Ethernet cable). An I/O controller may enable communication between any suitable element of chipset 116 (e.g., switch 130 (e.g., 130A, 130B)) and another device coupled to network 108. In some embodiments, network 108 may include a switch with bridging and/or routing functions that is external to the platform 102 and operable to couple various I/O controllers (e.g., NICs) distributed throughout the datacenter 100 (e.g., on different platforms) to each other. In various embodiments an I/O controller may be integrated with the chipset (i.e., may be on the same integrated circuit or circuit board as the rest of the chipset logic) or may be on a different integrated circuit or circuit board that is electromechanically coupled to the chipset. In some embodiments, communication interface 128 may also allow I/O devices integrated with or external to the platform (e.g., disk drives, other NICs, etc.) to communicate with the CPU cores.

Switch 130 may couple to various ports (e.g., provided by NICs) of communication interface 128 and may switch data between these ports and various components of chipset 116 according to one or more link or interconnect protocols, such as Peripheral Component Interconnect Express (PCIe), Compute Express Link (CXL), HyperTransport, GenZ, OpenCAPI, and others, which may each alternatively or collectively apply the general principles and/or specific features discussed herein. Switch 130 may be a physical or virtual (i.e., software) switch.

Platform logic 110 may include an additional communication interface 118. Similar to communication interface 128, this additional communication interface 118 may be used for the communication of signaling and/or data between platform logic 110 and one or more networks 108 and one or more devices coupled to the network 108. For example, communication interface 118 may be used to send and receive network traffic such as data packets. In a particular embodiment, communication interface 118 includes one or more physical I/O controllers (e.g., NICs). These NICs may enable communication between any suitable element of platform logic 110 (e.g., CPUs 112) and another device coupled to network 108 (e.g., elements of other platforms or remote nodes coupled to network 108 through one or more networks). In particular embodiments, communication interface 118 may allow devices external to the platform (e.g., disk drives, other NICs, etc.) to communicate with the CPU cores. In various embodiments, NICs of communication interface 118 may be coupled to the CPUs through I/O controllers (which may be external to or integrated with CPUs 112). Further, as discussed herein, I/O controllers may include a power manager 125 to implement power consumption management functionality at the I/O controller (e.g., by automatically implementing power savings at one or more interfaces of the communication interface 118 (e.g., a PCIe interface coupling a NIC to another element of the system), among other example features.

Platform logic 110 may receive and perform any suitable types of processing requests. A processing request may include any request to utilize one or more resources of platform logic 110, such as one or more cores or associated logic. For example, a processing request may include a processor core interrupt; a request to instantiate a software component, such as an I/O device driver 124 or virtual machine 132 (e.g., 132A, 132B); a request to process a network packet received from a virtual machine 132 or device external to platform 102 (such as a network node coupled to network 108); a request to execute a workload (e.g., process or thread) associated with a virtual machine 132, application running on platform 102, hypervisor 120 or other operating system running on platform 102; or other suitable request.

In various embodiments, processing requests may be associated with guest systems 122. A guest system may include a single virtual machine (e.g., virtual machine 132A or 132B) or multiple virtual machines operating together (e.g., a virtual network function (VNF) 134 or a service function chain (SFC) 136). As depicted, various embodiments may include a variety of types of guest systems 122 present on the same platform 102.

A virtual machine 132 may emulate a computer system with its own dedicated hardware. A virtual machine 132 may run a guest operating system on top of the hypervisor 120. The components of platform logic 110 (e.g., CPUs 112, memory 114, chipset 116, and communication interface 118) may be virtualized such that it appears to the guest operating system that the virtual machine 132 has its own dedicated components.

A virtual machine 132 may include a virtualized NIC (vNIC), which is used by the virtual machine as its network interface. A vNIC may be assigned a media access control (MAC) address, thus allowing multiple virtual machines 132 to be individually addressable in a network.

In some embodiments, a virtual machine 132B may be paravirtualized. For example, the virtual machine 132B may include augmented drivers (e.g., drivers that provide higher performance or have higher bandwidth interfaces to underlying resources or capabilities provided by the hypervisor 120). For example, an augmented driver may have a faster interface to underlying virtual switch 138 for higher network performance as compared to default drivers.

VNF 134 may include a software implementation of a functional building block with defined interfaces and behavior that can be deployed in a virtualized infrastructure. In particular embodiments, a VNF 134 may include one or more virtual machines 132 that collectively provide specific functionalities (e.g., wide area network (WAN) optimization, virtual private network (VPN) termination, firewall operations, load-balancing operations, security functions, etc.). A VNF 134 running on platform logic 110 may provide the same functionality as traditional network components implemented through dedicated hardware. For example, a VNF 134 may include components to perform any suitable NFV workloads, such as virtualized Evolved Packet Core (vEPC) components, Mobility Management Entities, 3rd Generation Partnership Project (3GPP) control and data plane components, etc.

SFC 136 is group of VNFs 134 organized as a chain to perform a series of operations, such as network packet processing operations. Service function chaining 136 may provide the ability to define an ordered list of network services (e.g. firewalls, load balancers) that are stitched together in the network to create a service chain.

A hypervisor 120 (also known as a virtual machine monitor) may include logic to create and run guest systems 122. The hypervisor 120 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 110. Services of hypervisor 120 may be provided by virtualizing in software or through hardware assisted resources that require minimal software intervention, or both. Multiple instances of a variety of guest operating systems may be managed by the hypervisor 120. Each platform 102 may have a separate instantiation of a hypervisor 120.

Hypervisor 120 may be a native or bare-metal hypervisor that runs directly on platform logic 110 to control the platform logic and manage the guest operating systems. Alternatively, hypervisor 120 may be a hosted hypervisor that runs on a host operating system and abstracts the guest operating systems from the host operating system. Various embodiments may include one or more non-virtualized platforms 102, in which case any suitable characteristics or functions of hypervisor 120 described herein may apply to an operating system of the non-virtualized platform.

Hypervisor 120 may include a virtual switch 138 that may provide virtual switching and/or routing functions to virtual machines of guest systems 122. The virtual switch 138 may include a logical switching fabric that couples the vNICs of the virtual machines 132 to each other, thus creating a virtual network through which virtual machines may communicate with each other. Virtual switch 138 may also be coupled to one or more networks (e.g., network 108) via physical NICs of communication interface 118 so as to allow communication between virtual machines 132 and one or more network nodes external to platform 102 (e.g., a virtual machine running on a different platform 102 or a node that is coupled to platform 102 through the Internet or other network). Virtual switch 138 may include a software element that is executed using components of platform logic 110. In various embodiments, hypervisor 120 may be in communication with any suitable entity (e.g., a SDN controller) which may cause hypervisor 120 to reconfigure the parameters of virtual switch 138 in response to changing conditions in platform 102 (e.g., the addition or deletion of virtual machines 132 or identification of optimizations that may be made to enhance performance of the platform).

Hypervisor 120 may include any suitable number of I/O device drivers 124. I/O device driver 124 represents one or more software components that allow the hypervisor 120 to communicate with a physical I/O device. In various embodiments, the underlying physical I/O device may be coupled to any of CPUs 112 and may send data to CPUs 112 and receive data from CPUs 112. The underlying I/O device may utilize any suitable communication protocol, such as PCI, PCIe, Universal Serial Bus (USB), Serial Attached SCSI (SAS), Serial ATA (SATA), InfiniBand, Fibre Channel, an IEEE 802.3 protocol, an IEEE 802.11 protocol, or other current or future signaling protocol.

The underlying I/O device may include one or more ports operable to communicate with cores of the CPUs 112. Cores, as discussed herein, may be embodied within hardware circuitry to implement processor logic of a processor device and may be embodied or incorporated (in many cases with one or more other cores) in CPUs, graphic processing units (GPUs), tensor processing units (TPUs), field programmable gate array (FPGA) devices, application specific integrated circuit (ASIC) devices, hardware accelerators, and other devices or compute blocks used to handle at least some of the processing workload for a computing system. In one example, the underlying I/O device is a physical NIC or physical switch. For example, in one embodiment, the underlying I/O device of I/O device driver 124 is a NIC of communication interface 118 having multiple ports (e.g., Ethernet ports).

In other embodiments, underlying I/O devices may include any suitable device capable of transferring data to and receiving data from CPUs 112, such as an audio/video (A/V) device controller (e.g., a graphics accelerator or audio controller); a data storage device controller, such as a flash memory device, magnetic storage disk, or optical storage disk controller; a wireless transceiver; a network processor; or a controller for another input device such as a monitor, printer, mouse, keyboard, or scanner; or other suitable device.

In various embodiments, when a processing request is received, the I/O device driver 124 or the underlying I/O device may send an interrupt (such as a message signaled interrupt) to any of the cores of the platform logic 110. For example, the I/O device driver 124 may send an interrupt to a core that is selected to perform an operation (e.g., on behalf of a virtual machine 132 or a process of an application). Before the interrupt is delivered to the core, incoming data (e.g., network packets) destined for the core might be cached at the underlying I/O device and/or an I/O block associated with the CPU 112 of the core. In some embodiments, the I/O device driver 124 may configure the underlying I/O device with instructions regarding where to send interrupts.

In some embodiments, as workloads are distributed among the cores, the hypervisor 120 may steer a greater number of workloads to the higher performing cores than the lower performing cores. In certain instances, cores that are exhibiting problems such as overheating or heavy loads may be given less tasks than other cores or avoided altogether (at least temporarily). Workloads associated with applications, services, containers, and/or virtual machines 132 can be balanced across cores using network load and traffic patterns rather than just CPU and memory utilization metrics.

The elements of platform logic 110 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the data system 100 may be coupled together in any suitable, manner such as through one or more networks 108. A network 108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may include any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can include any number of hardware or software elements coupled to (and in communication with) each other through a communications medium. In various embodiments, guest systems 122 may communicate with nodes that are external to the datacenter 100 through network 108.

Current practices in data analytics and artificial intelligence perform tasks such as object classification on unending streams of data. Computing infrastructure for classification is predominantly oriented toward "dense" compute, such as matrix computations. The continuing exponential growth in generated data has shifted some compute to be offloaded to GPUs and other application-focused accelerators across multiple domains that are dense-compute dominated. However, the next step in the evolution in both artificial intelligence (AI), machine learning, and data analytics is reasoning about the relationships between these classified objects. In some implementations, a graph structure (or data structure) may be defined and utilized to define relationships between classified objects. For instance, determining the relationships between entities in a graph is the basis of graph analytics. Graph analytics poses important challenges on existing processor architectures due to its sparse structure.

High-performance large scale graph analytics is essential to timely analyze relationships in big data sets. The combination of low performance and very large graph sizes has traditionally limited the usability of graph analytics. Indeed, conventional processor architectures suffer from inefficient resource usage and bad scaling on graph workloads. Recognizing both the increasing importance of graph analytics and the need for vastly improved sparse computation performance compared to traditional approaches, an improved system architecture is presented herein that is adapted to performing high-performance graph processing by addressing constraints across the network, memory, and compute architectures that typically limit performance on graph workloads.

Figure 2A:
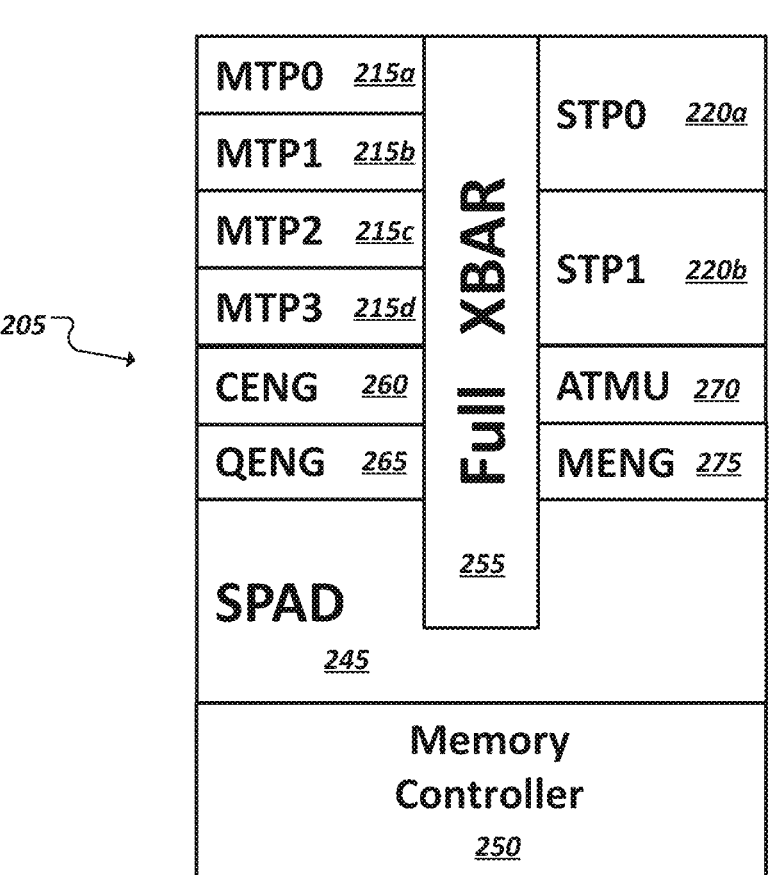
FIG. 2A is a simplified block diagram illustrating an example graph processing core.

FIG. 2A is a simplified block diagram 200a representing the general architecture of an example graph processing core 205. While a graph processing core 205, as discussed herein, may be particularly adept, at an architectural level, at handling workloads to implement graph-based algorithms, it should be appreciated that the architecture of a graph processing core 205 may handle any program developed to utilize its architecture and instruction set, including programs entirely unrelated to graph processing. Indeed, a graph processing core (e.g., 205) may adopt an architecture configured to provide massive multithreading and enhanced memory efficiency to minimize latency to memory and hide remaining latency to memory. Indeed, the high input/output (I/O) and memory bandwidth of the architecture enable the graph processing core 205 to be deployed in a variety of applications where memory efficiency is at a premium and memory bandwidth requirements made by the application are prohibitively demanding to traditional processor architectures. Further, the architecture of the graph processing core 205 may realize this enhanced memory efficiency by granularizing its memory accesses in relatively small, fixed chunks (e.g., 8B random access memory), equipping the cores with networking capabilities optimized for corresponding small transactions, and providing extensive multithreading.

In the example of FIG. 2A, an example graph processing core 205 may include a number of multi-threaded pipelines or cores (MTCs) (e.g., 215a-d) and a number single-threaded pipelines or cores (e.g., 220a-b). In some implementations, the MTCs and STCs may architecturally the same, but for the ability of the MTCs to support multiple concurrent thread and switching between these threads. For instance, respective MTC and STC may have 32 registers per thread, all state address map, and utilize a common instruction set architecture (ISA). In one example, the pipeline/core ISAs may be Reduced Instruction Set Computer (RISC)-based, fixed length instructions.

In one example, respective MTC (e.g., 215a-d) may support sixteen threads with only minimal interrupt handling. For instance, each thread in an MTC may execute a portion of a respective instruction, with the MTC switching between the active threads automatically or opportunistically (e.g., switch from executing one thread to the next in response to a load operation by the first thread so as to effectively hide the latency of the load operation (allowing the other thread or threads to operate during the cycles needed for the load operation to complete), among other examples). An MTC thread may be required to finishing executing its respective instruction before taking on another. In some implementations, the MTCs may adopt a barrel model, among other features or designs. STC's may execute a single thread at a time and may support full interrupt handling. Portions of a workload handled by a graph processing core 205 may be divided not only between the MTCs (e.g., with sixteen threads per MTC), but also between the MTCs 215a-d and STCs 220a-b. For instance, STCs 220a-b may be optimized for various types of operations (e.g., load-store forwarding, branch predictions, etc.) and programs may make use of STCs for some operations and the multithreading capabilities of the MTCs for other instructions.

An example graph processing core 205 may include additional circuitry to implement components such as a scratchpad 245, uncore, and memory controller (e.g., 250). Components of the graph processing core 205 may be interconnected via a crossbar interconnect (e.g., a full crossbar 255) that ties all components in the graph processing core 205 together in a low latency, high bandwidth network. The memory controller 250 may be implemented as a narrow channel memory controller, for instance, supporting a narrow, fixed 8-byte memory channel. Data pulled using the memory controller from memory in the system may be loaded into a scratchpad memory region 245 for use by other components of the graph processing core 205. In one example, the scratchpad may provide 2 MB of scratchpad memory per core (e.g., MTC and STC) and provide dual network ports (e.g., via 1 MB regions).

In some implementations, an uncore region of a graph processing core 205 may be equipped with enhanced functionality to allow the MTCs 215a-d and STCs 220a-b to handle exclusively substantive, algorithmic workloads, with supporting work handled by the enhanced uncore, including synchronization, communication, and data movement/migration. The uncore may perform a variety of tasks including copy and merge operations, reductions, gathers/scatters, packs/unpacks, in-flight matrix transposes, advanced atomics, hardware collectives, reductions in parallel prefixes, hardware queuing engines, and so on. The ISA of the uncore can come from the pipelines' (MTCs and STCs) synchronous execution. In one example, the uncore may include components such as a collective engine 260, a queue engine 265, an atomic engine 270, and memory engine 275, among other example components and corresponding logic. An example memory engine 275 may provide an internal DMA engine for the architecture. The queue engine 265 can orchestrate and queue messaging within the architecture, with messages optimized in terms of (reduced) size to enable very fast messaging within the architecture. An example collective engine 260 may handle various collective operations for the architecture, including reductions, barriers, scatters, gathers, broadcasts, etc. The atomic engine 270 may handle any memory controller lock scenarios impacting the memory controller 250, among other example functionality.

Figure 2B:
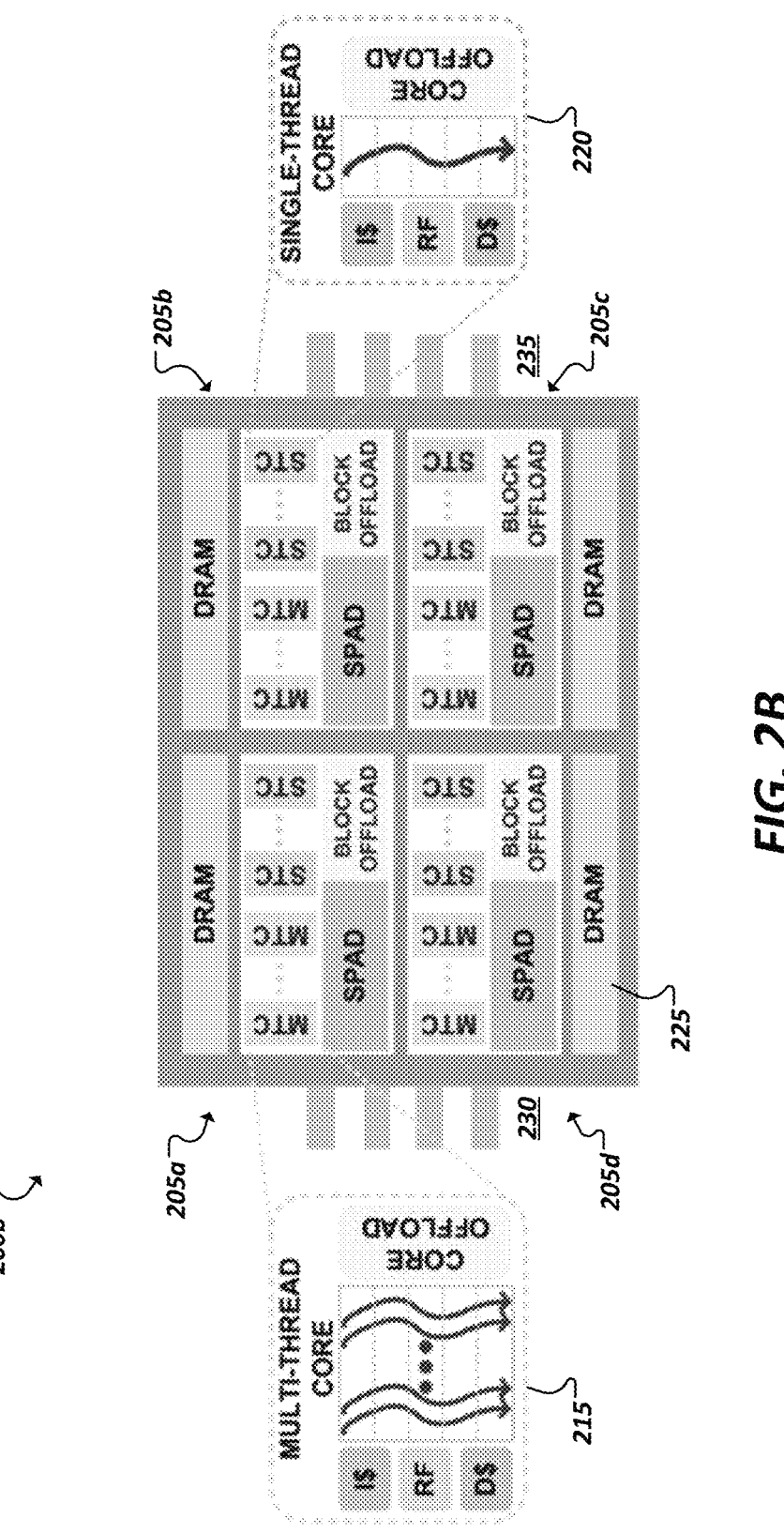
FIG. 2B is a simplified block diagram illustrating an example graph processing device.

FIG. 2B is a simplified block diagram illustrating an example system 200b with a set of graph processing cores 205a-d. A graph processing node may include a respective graph processing core (e.g., 205a-d) and a corresponding memory (e.g., dynamic random access memory (DRAM) (e.g., 225)). Each node may include a respective graph processing core (e.g., 205), which includes a set of MTCs (e.g., 215) as well as a set of single-thread cores (STCs) (e.g., 220), such as in the example graph processing core 205 illustrated and described above in the example of FIG. 2A. In one example, multiple graph processing nodes may be incorporated in or mounted on the same package or board and interconnected via a high-radix (e.g., multiple (e.g., >3) ports per connection), low-diameter (e.g., of 3 or less) network. The example system 200 may further include interconnect ports (e.g., 230, 235) to enable the system 200 to be coupled to other computing elements including other types of processing units (e.g., central processing units (CPUs), graphical processing units (GPUs), tensor processing units (TPUs), etc. In some cases, a graph processing chip, chiplet, board, or device (e.g., system 200) may be coupled to other graph processing devices (e.g., additional instances of the same type of graph processing system (e.g., 200). In some implementations, interconnects 230, 235 may be utilized to couple to other memory devices, allowing this external memory and local DRAM (e.g., 225) to function as shared system memory of the graph processing nodes for use by graph processing cores and other logic of the graph processing nodes, among other examples.

Figure 3A:
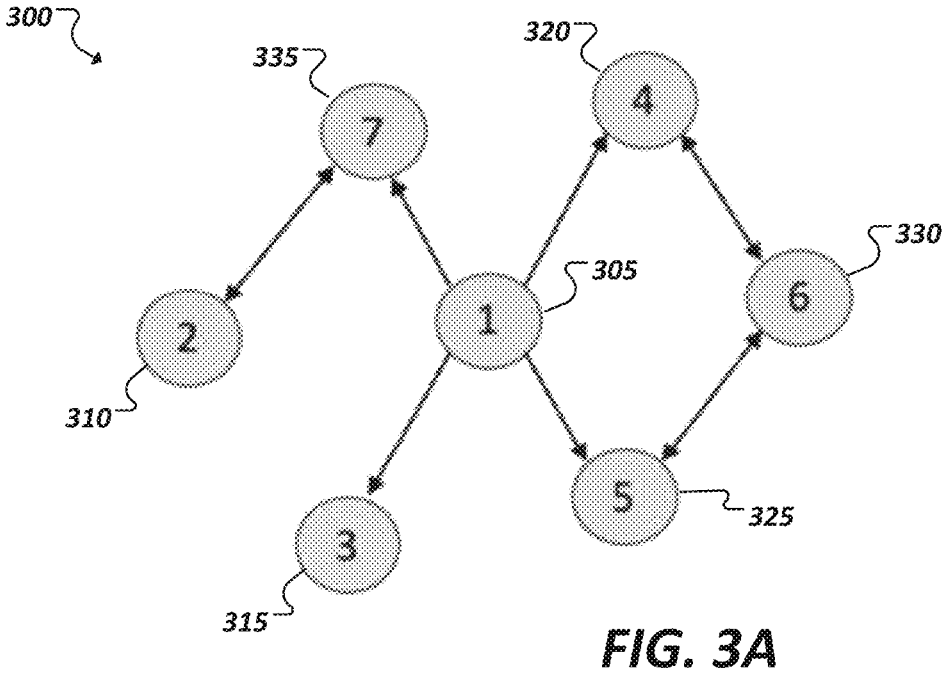
FIG. 3A is a simplified block diagram illustrating a simplified example of a graph structure.
Figure 3B:
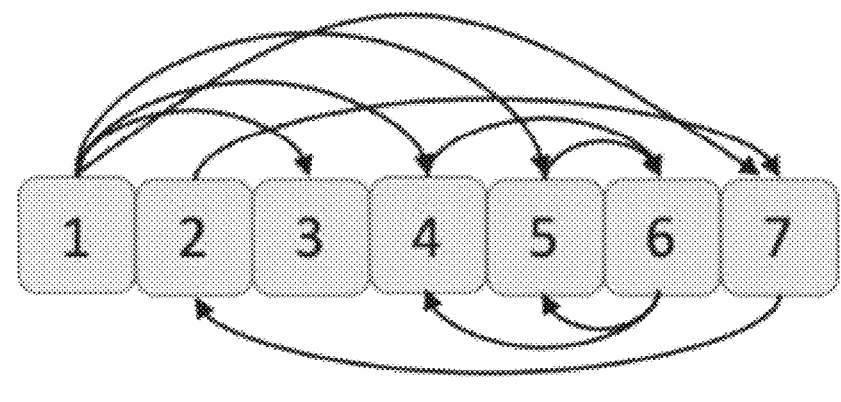
FIG. 3B is a simplified block diagram illustrating a representation of an example access stream using an example graph structure.

FIG. 3A is a simplified representation of an example graph structure 300. The graph structure may be composed of multiple interconnected nodes (e.g., 305, 310, 315, 320, 325, 330, 335). An edge is defined by the interface between one graph node and respective neighboring graph node. Each node may be connected to one or more other nodes in the graph. The sparseness of graph data structures leads to scattered and irregular memory accesses and communication, challenging the decades-long optimizations made in traditional dense compute solutions. As an example, consider the common case of pushing data along the graph edges (e.g., with reference to the simplified graph 300 example of FIG. 3A). All vertices initially store a value locally and then proceed to add their value to all neighbors along outgoing edges. This basic computation is ubiquitous in graph algorithms. FIG. 3B illustrates a representation 350 of an example access stream (e.g., from node 1 (305)), which illustrates the irregularity and lack of locality in such operations, making conventional prefetching and caching effectively useless.

More generally, graph algorithms face several major scalability challenges on traditional CPU and GPU architectures, because of the irregularity and sparsity of graph structures. For instance, in traditional cache-based processor architectures, which utilize prefetching, the execution of graph applications may suffer from inefficient cache and bandwidth utilization. Due to the sparsity of graph structures, caches used in such applications are thrashed with single-use sparse accesses and useless prefetches where most (e.g., 64 byte) memory fetches contain only a small amount (e.g., 8-bytes out of 64) of useful data. Further, overprovisioning memory bandwidth and/or cache space to cope with sparsity is inefficient in terms of power consumption, chip area and I/O pin count.

Further analysis of graph algorithms shows additional problems in optimizing performance. For instance, in the execution of graph algorithms, the computations may be irregular in character—they exhibit skewed compute time distributions, encounter frequent control flow instructions, and perform many memory accesses. For instance, for an example graph-based link analysis algorithm for a search engine, the compute time for a vertex in the algorithm is proportional to the number of outgoing edges (degree) of that vertex. Graphs such as the one illustrated in FIG. 3A may have skewed degree distributions, and thus the work per vertex has a high variance, leading to significant load imbalance. Graph applications may be heavy on branches and memory operations. Furthermore, conditional branches are often data dependent, e.g., checking the degree or certain properties of vertices, leading to irregular and therefore hard to predict branch outcomes. Together with the high cache miss rates caused by the sparse accesses, conventional performance oriented out-of-order processors are largely underutilized: most of the time they are stalled on cache misses, while a large part of the speculative resources is wasted due to branch mispredictions.

As additional example shortcomings of conventional computing architectures' availability to handle graph processing, graph algorithms require frequent fine- and coarse-grained synchronization. For example, fine-grained synchronizations (e.g., atomics) may be required in a graph algorithm to prevent race conditions when pushing values along edges. Synchronization instructions that resolve in the cache hierarchy place a large stress on the cache coherency mechanisms for multi-socket systems, and all synchronizations incur long round-trip latencies on multi-node systems. Additionally, the sparse memory accesses result in even more memory traffic for synchronizations due to false sharing in the cache coherency system. Coarse-grained synchronizations (e.g., system-wide barriers and prefix scans) fence the already-challenging computations in graph algorithms. These synchronizations have diverse uses including resource coordination, dynamic load balancing, and the aggregation of partial results. These synchronizations can dominate execution time on large-scale systems due to high network latencies and imbalanced computation.

Additionally, current commercial graph databases may be quite large (e.g., exceed 20 TB as an in-memory representation). Such large problems may exceed the capabilities of even a rack of computational nodes of any type, which requires a large-scale multi-node platform to even house the graph's working set. When combined with the prior observations—poor memory hierarchy utilization, high control flow changes, frequent memory references, and abundant synchronizations—reducing the latency to access remote data is a challenge, combined with latency hiding techniques in the processing elements, among other example considerations. Traditional architectures and their limitations in being able to effectively handle graph algorithms extends beyond CPUs to include traditional GPU—sparse accesses prevent memory coalescing, branches cause thread divergence and synchronization limits thread progress. While GPUs may have more threads and much higher memory bandwidth, GPUs have limited memory capacity and limited scale-out capabilities, which means that they are unable to process large, multi-TB graphs. Furthermore, where graphs are extremely sparse (<<1% non-zeros), typical GPU memory usage is orders of magnitude less efficient, making GPUs all but unusable outside of the smallest graphs, among other example issues.

An improved computing system architecture may be implemented in computing systems to enable more efficient (e.g., per watt performance) graph analytics. In one example, specialized graph processing cores may be networked together in a low diameter, high radix manner to more efficiently handle graph analytics workloads. The design of such graph processing cores builds on the observations that most graph workloads have abundant parallelism, are memory bound and are not compute intensive. These observations call for many simple pipelines, with multi-threading to hide memory latency. Returning to the discussion of FIG. 2, such graph processing cores may be implemented as multi-threaded cores (MTC), which are round-robin multi-threaded in-order pipeline. In one implementation, at any moment, each thread in an MTC can only have one in-flight instruction, which considerably simplifies the core design for better energy efficiency. Single-threaded cores (STC) are used for single-thread performance sensitive tasks, such as memory and thread management threads (e.g., from the operating system). These are in-order stall-on-use cores that are able to exploit some instruction and memory-level parallelism, while avoiding the high-power consumption of aggressive out-or-order pipelines. In some implementations, both MTCs and STCs may implement the same custom RISC instruction set.

Figure 4:
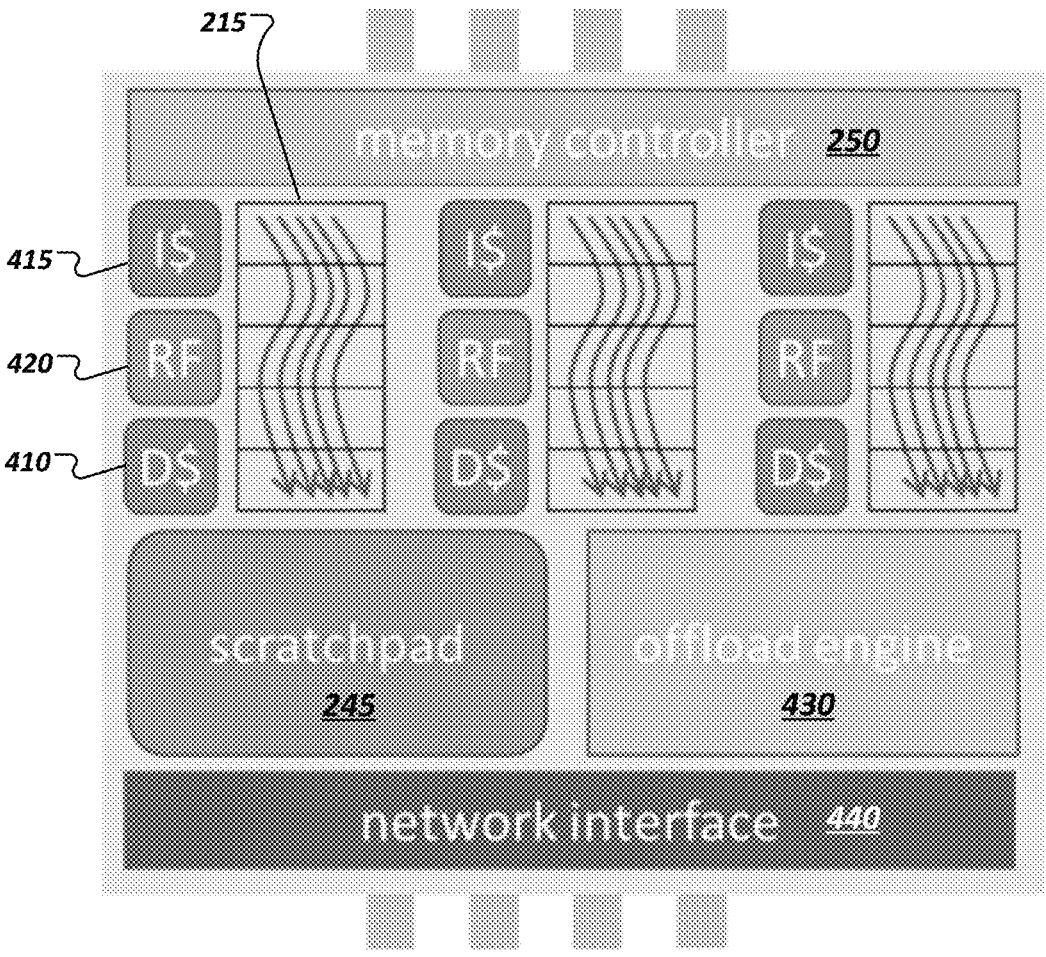
FIG. 4 is a simplified block diagram illustrating example components of an example graph processing core.

Turning to FIG. 4, a simplified block diagram 400 is shown illustrating example components of an example graph processing core device (e.g., 205). A graph processing core device may include a set of multi-threaded cores (MTCs) (e.g., 215). In some instances, both multi-threaded cores and single threaded cores (STCs) may be provided within a graph processing block. Further, each core may have a small data cache (D$) (e.g., 410) and an instruction cache (I$) (e.g., 415), and a register file (RF) (e.g., 420) to support its thread count. Because of the low locality in graph workloads, no higher cache levels need be included, avoiding useless chip area and power consumption of large caches. For scalability, in some implementations, caches are not coherent. In such implementations, programs that are to be executed using the system may be adapted to avoid modifying shared data that is cached, or to flush caches if required for correctness. As noted above, in some implementations, MTCs and STCs are grouped into blocks, each of which may be provided with a large local scratchpad (SPAD) memory 245 for low latency storage. Programs run on such platforms may selecting which memory accesses to cache (e.g., local stack), which to put on SPAD (e.g., often reused data structures or the result of a direct memory access (DMA) gather operation), and which not to store locally. Further, prefetchers may be omitted from such architectures to avoid useless data fetches and to limit power consumption. Instead, some implementations may utilize offload engines or other circuitry to efficiently fetch large chunks of useful data.

Figure 5:
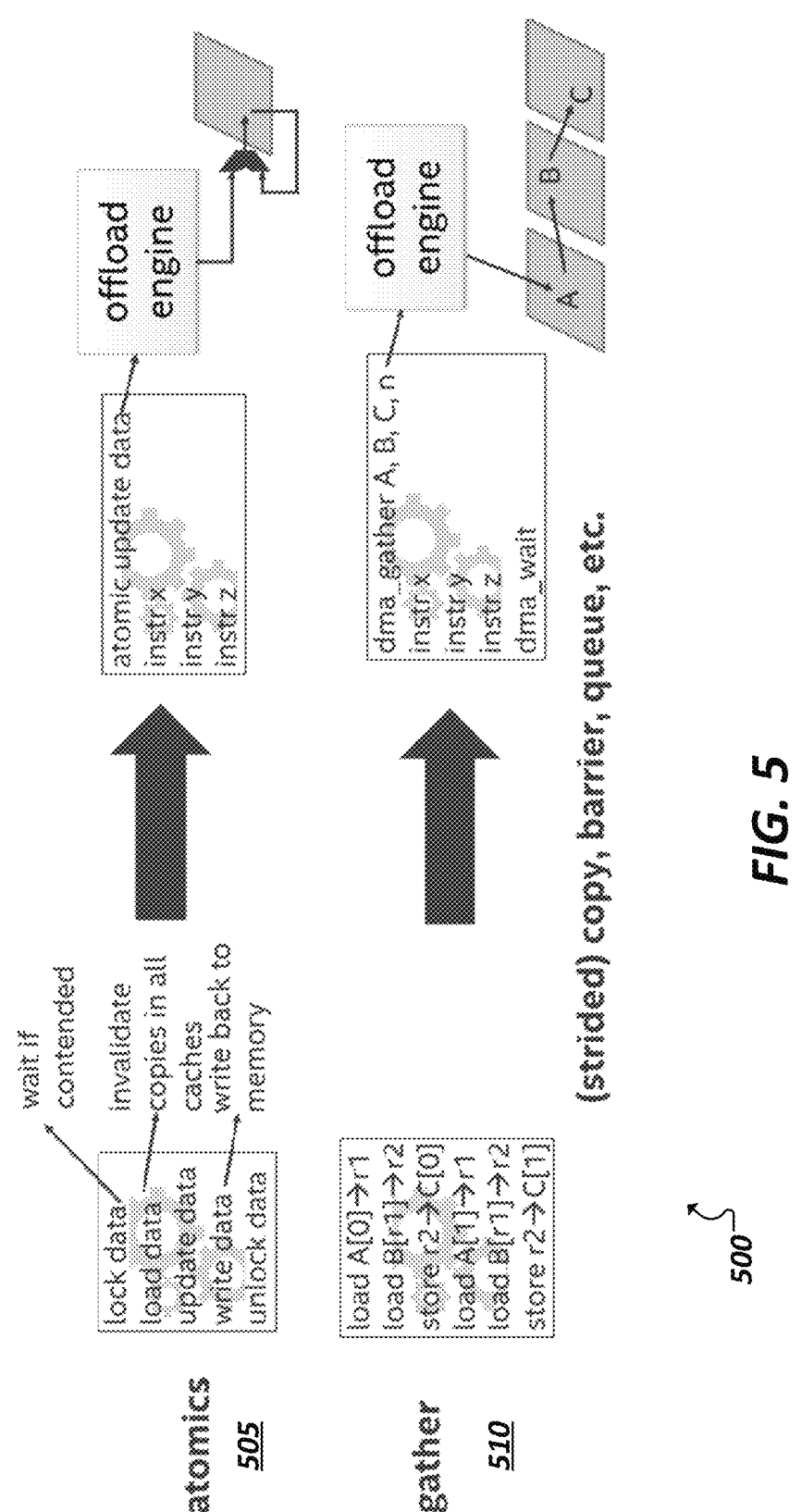
FIG. 5 is a diagram illustrating example operations of an example graphic processing core offload engine.

Continuing with this example, although the MTCs of an example graph processing core hide some of the memory latency by supporting multiple concurrent threads, an MTC may adopt an in-order design, which limits the number of outstanding memory accesses to one per thread. To increase memory-level parallelism and to free more compute cycles to the graph processing core, a memory offload engine (e.g., 430) may be provided for each block. The offload engine performs memory operations typically found in many graph applications in the background, while the cores continue with their computations. Turning to FIG. 5, a simplified block diagram 500 is shown illustrating example operations of an example graphic processing core offload engine (e.g., 430) including atomics 505 and gather operations 510, among other examples. Further, a direct memory access (DMA) engine may perform operations such as (strided) copy, scatter and gather. Queue engines may also be provided, which are responsible for maintaining queues allocated in shared memory, alleviating the core from atomic inserts and removals, among other example benefits. The logic of an offload engine can be used for work stealing algorithms and dynamically partitioning the workload. Further, the offload engines can implement efficient system-wide reductions and barriers. Remote atomics perform atomic operations at the memory controller where the data is located, instead of burdening the pipeline with first locking the data, moving the data to the core, updating it, writing back, and unlocking. They enable efficient and scalable synchronization, which is indispensable for the high thread count in this improved graph-optimized system architecture. The collective logic (or engines) of the offload engines may directed by the graph processing cores using specific instructions defined in an instruction set. These instructions may be non-blocking, enabling the graph processing cores to perform other work while these memory management operations are performed in the background. Custom polling and waiting instructions may also be included within the instruction set architecture (ISA) for use in synchronizing the threads and offloaded computations, among other example features. In some implementations, example graph processing cores and chipsets may not rely on any locality. Instead, the graph processing cores may collectively use their offload engines to perform complex system wide memory operations in parallel, and only move the data that is eventually needed to the core that requests it. For example, a DMA gather will not move the memory stored indices or addresses of the data elements to gather to the requesting core, but only the requested elements from the data array.

Returning to FIG. 4, an example graph processing device may additionally include a memory controller 250 to access and manage requests of local DRAM. Further, sparse and irregular accesses to a large data structure are typical for graph analysis applications. Therefore, accesses to remote memory should be done with minimal overhead. An improved system architecture, such as introduced above, utilizing specialized graph processing cores adapted for processing graph-centric workload may, in some implementations, implement a hardware distributed global address space (DGAS), which enables respective cores (e.g., graph processing core or support dense core) to uniformly access memory across the full system, which may include multiple nodes (e.g., a multiple graph processing core, corresponding memory, and memory management hardware) with one address space. Accordingly, a network interface (e.g., 440) may be provided to facilitate network connections between processing cores (e.g., on the same or different die, package, board, rack, etc.).

Besides avoiding the overhead of setting up communication for remote accesses, a DGAS also greatly simplifies programming, because there is no implementation difference between accessing local and remote memory. Further, in some implementations, address translation tables (ATT) may be provided, which contain programmable rules to translate application memory addresses to physical locations, to arrange the address space to the need of the application (e.g., address interleaved, block partitioned, etc.). Memory controllers may be provided within the system (e.g., one per block) to natively support relatively small cache lines (e.g., 8 byte accesses, rather than 64 byte accesses), while supporting standard cache line accesses as well. Such components may enable only the data that is actually needed to be fetched, thereby reducing memory bandwidth pressure and utilizing the available bandwidth more efficiently.

Figure 6:
FIG. 6 is a simplified block diagram illustrating an example implementation of a graph processing system including both graph processing cores and dense compute cores.

As noted above, a system, implemented as a chiplet, board, rack, or other platform, may include multiple interconnected graph processing cores, among other hardware elements. FIG. 6 is a simplified block diagram 600 showing an example implementation of a graph processing system 602 including a number of graph processing cores (e.g., 205*a-h*) each coupled to a high-radix, low-diameter network to interconnect all of the graph processing cores in the system. In this example implementations, the system may further include dense compute cores (e.g., 605*a-h*) likewise interconnected. In some instances, kernel functions, which would more efficiently be executed using dense compute logic may be offloaded from the graph processing cores to one or more of the dense compute cores. The graph processing cores may include associated memory blocks, which may be exposed to programmers via their own memory maps. Memory controllers (MC) (e.g., 610) may be provided in the system to other memory, including memory external to the system (e.g., on a different die, board, or rack). High speed input/output (HSIO) circuitry (e.g., 615) may also be provided on the system to enable core blocks and devices to couple to other computing devices, such as compute, accelerator, networking, and/or memory devices external to the system, among other examples.

A network may be provided in a system to interconnect the component within the system (e.g., on the same SoC or chiplet die, etc.) and the attributes of the network may be specially configured to support and enhance the graph processing efficiencies of the system. Indeed, the network connecting the blocks is responsible for sending memory requests to remote memory controllers. Similar to the memory controller, it is optimized for small messages (e.g., 8 byte messages). Furthermore, due to the high fraction of remote accesses, network bandwidth may exceed local DRAM bandwidth, which is different from conventional architectures that assume higher local traffic than remote traffic. To obtain high bandwidth and low latency to remote blocks, the network needs a high radix and a low diameter. Various topologies may be utilized to implement such network dimensions and characteristics. In one example, a HyperX topology may be utilized, with all-to-all connections on each level. In some implementations, links in the highest levels are implemented as optical links to ensure power-efficient, high-bandwidth communication. The hierarchical topology and optical links enable the system to efficiently scale out to many nodes, maintaining easy and fast remote access.

Figure 7:
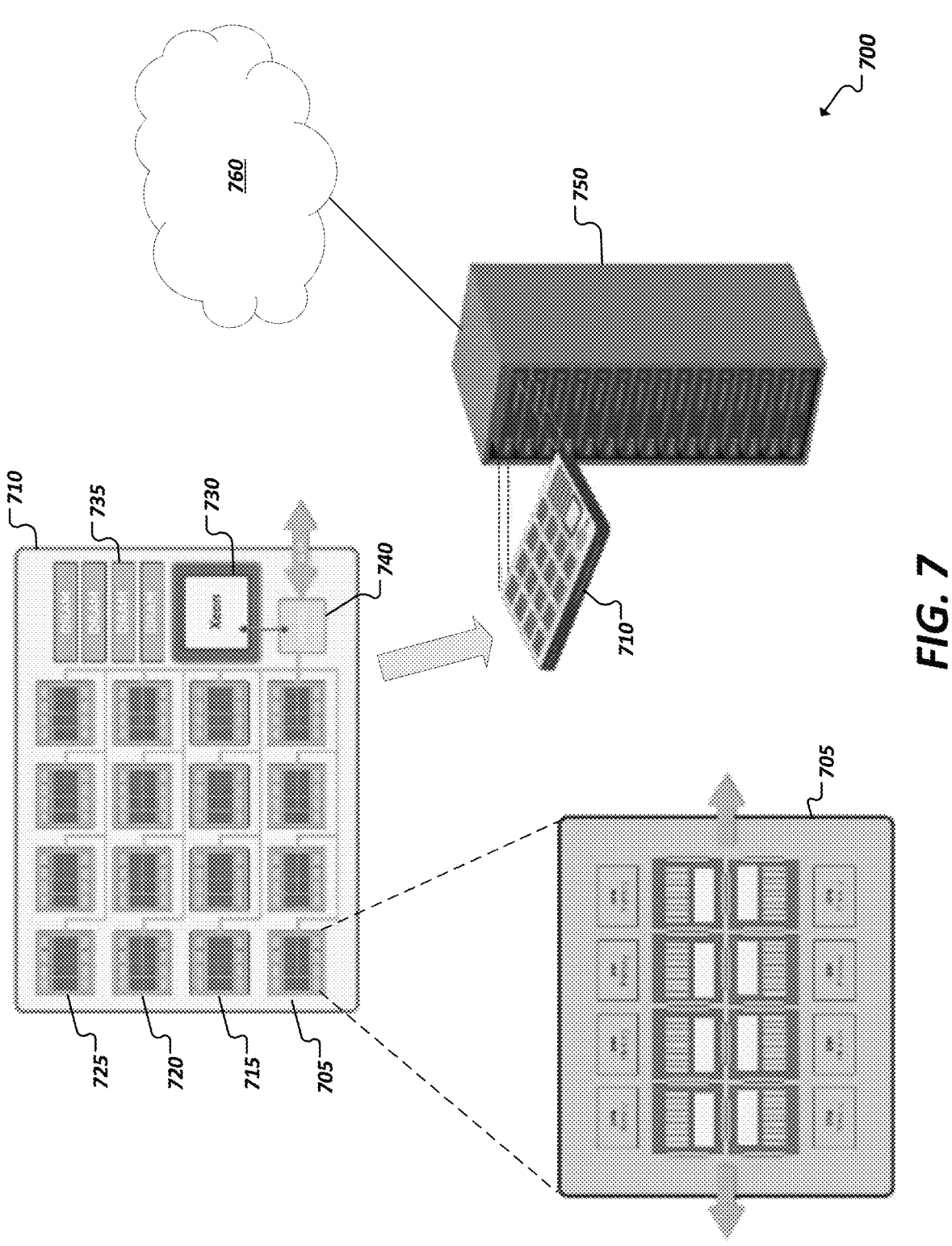
FIG. 7 is a simplified block diagram illustrating an example system.

FIG. 7 is a simplified block diagram showing the use of an example graph processing system (incorporating graph processing cores, such as discussed above) in a server system. A graph processing device (e.g., 705) may be provided with a set of graph processing cores (and in some cases, supplemental dense compute cores). A graph processing device 705 may enable specialized processing support to handle graph workloads with small and irregular memory accesses through near-memory atomics, among other features, such as discussed above. Multiple such graph processing devices (e.g., 705, 715, 720, 725, etc.) may be provided on a board, rack, blade, or other platform (e.g., 710). In some implementations, the platform system 710 may include not only an interconnected network of graph processing devices (and their constituent graph processing cores), but the system 710 may further include general purpose processors (e.g., 730), SoC devices, accelerators, memory elements (e.g., 735), as well additional switches, fabrics, or other circuitry (e.g., 740) to interconnect and facilitate the communication of data between devices (e.g., 705-740) on the platform. The system 710 may adopt a global memory model and be interconnected consistent with the networking and packaging principles described herein to enable high I/O and memory bandwidth.

In some implementations, the system 710 may itself be capable of being further connected to other systems, such as other blade systems in a server rack system (e.g., 750). Multiple systems within the server system 750 may also be equipped with graph processing cores to further scale the graph processing power of a system. Indeed, multiple servers full of such graph processing cores may be connected via a wider area network (e.g., 760) to further scale such systems. The networking of such devices using the proposed graph processing architecture offers networking as a first-class citizen, supports point-to-point messaging, and relies upon a flattened latency hierarchy, among other example features and advantages.

In one example system, a C/C++ compiler (e.g., based on LLVM) may be utilized in the development of software for use with the graph processing systems described herein. For instance, the compiler may support a Reduced Instruction Set Computer (RISC) instruction set architecture (ISA) of the graph processing system, including basic library functions. In some implementations, graph-processing-specific operations, such as the offload engines and remote atomics, are accessible using intrinsics. Additionally, the runtime environment of the system may implement basic memory and thread management, supporting common programming models, such as gather-apply-scatter, task-based and single program, multiple data (SPMD)-style parallelism. Among other tools, an architectural simulator for the graph processing architecture may be provided to simulate the timing of all instructions in the pipelines, engines, memory, and network, based on the hardware specifications. Additional software development tools may be provided to assist developers is developing software for such graph processing systems, such as tools to simulate execution of the software, generate performance estimations of running a workload on the system, performance analysis reports (e.g., CPI stacks and detailed performance information on each memory structure and each instruction), among other example features. Such tools may enable workload owners to quickly detect bottleneck causes, and to use these insights to optimize the workload for graph processing systems.

In some implementations, software developed to perform graph analytics using the improved graph processing architecture discussed herein may be implemented as basic kernels, library overhead may be limited. In networked systems of multiple graph processing cores, the application code does not need to change for multinode execution, thanks to the system-wide shared memory. As an example, a software application may be written to cause the graph processing system to perform a sparse matrix dense vector multiplication (SpMV) algorithm. The basic operation of SpMV may include a multiply-accumulate of sparse matrix elements and a dense vector. A matrix input may be provided (e.g., an RMAT-30 synthetic matrix) stored in compressed sparse row (CSR) format. In one example, a straightforward implementation of SpMV may be programmed, with each thread of the graph processing cores calculating one or more elements of the result vector. The rows are partitioned across the threads based on the number of non-zeros for a balanced execution. It does not make use of DMA operations, and all accesses are non-cached at a default length (e.g., 8-byte), with thread local stack accesses cached by default. Such an implementation may outperform high performance CPU architectures (e.g., Intel Xeon) through the use of a higher thread count and 8-byte memory accesses, avoiding memory bandwidth saturation. In other implementations of an SpMV algorithm may be programmed to execute on the graph processing architecture utilizing selective caching. For instance, accesses to the matrix values are cached, while the sparse accesses to the vector bypass caches. In the compressed sparse row (CSR) representation of a sparse matrix, all non-zero elements on a row are stored consecutively and accessed sequentially, resulting in spatial locality. The dense vector, on the other hand, is accessed sparsely, because only a few of its elements are needed for the multiply-accumulate (the indices of the non-zeros in the row of the matrix). Accordingly, the accesses to the matrix are cached, while the vector accesses remain uncached 8-byte accesses, leading to a further potential performance improvement relative to CPU architectures. Further, an implementation of the SpMV algorithm may be further enhanced using a graph processing architecture, for instance, by a DMA gather operation to fetch the elements of the dense vector that are needed for the current row from memory. These elements may then be stored on local scratchpad. The multiply-accumulate reduction is then done by the core, fetching the matrix elements from cache and the vector elements from scratchpad. Not only does this significantly reduce the number of load instructions, it also reduces data movement: the index list does not need to be transferred to the requesting core, only the final gathered vector elements. While data is gathered, the thread is stalled, allowing other threads that have already fetched their data to compute a result vector element.

Programs, such as the examples above, may be designed to effectively use the graph processing architecture (e.g., using more than 95% of the available memory bandwidth, while not wasting bandwidth on useless and sparse accesses) and realize potentially exponential efficiency improvement over traditional architectures. Further, the improved graph processing architecture provide much higher thread count support (e.g., 144 threads for Xeon, verses thousands of threads (e.g., 16,000+) in the graph processing core implementation), enabling threads to progress while others are stalled on memory operations, efficient small size local and remote memory operations, and powerful offload engines that allow for more memory/compute overlap. Scaling graph processing systems (e.g., with multiple nodes) may yield compounding benefits (even if not perfectly linear, for instance, due to larger latencies and bandwidth restrictions or other example issues) to significantly outperform other multi-node conventional multinode processor configurations. While the examples focus on an SpMV algorithm, it should be appreciated that this example was offered as but one of many example graph algorithms. Similar programs may be developed to leverage the features of a graph processing architecture to more efficiently perform other graph-based algorithms including application classification, random walks, graph search, Louvain community, TIES sampler, Graph2Vec, Graph Sage, Graph Wave, parallel decoding FST, geolocation, breadth-first search, sparse matrix-sparse vector multiplication (SpMSpV), among other examples.

As noted above, sparse workloads exhibit a large number of random remote memory accesses and have been shown to be heavily network and memory bandwidth-intensive and less dependent on compute capability. While the graph processing architecture discussed herein provides efficient support for workloads that are truly sparse (and may be alternatively referred to as "sparse compute" devices), such a graph processing architecture lacks sufficient compute performance to execute dense kernels (e.g., matrix multiply, convolution, etc.) at needed performance in some applications. Dense kernels are a critical component of many critical compute applications such as image processing. Even with matrix computation units included, a challenge remains of effective integration of dense compute and offloading operations with regards to memory movement, matrix operation definition, and controllability across multiple threads.

Traditional offloading techniques (e.g., for offloading to an on-chip accelerator in an SoC) include memory mapped registers. For instance, the pipeline/core can perform the offload of the computation by writing to memory mapped registers present inside the accelerator. These registers may specify configurations as well as data needed to be used for the computation. This may also require the pipeline to monitor/poll registers if it is not sure that the offload engine is idle. In one example of a graph processing, an enhanced offload mechanism may be used to offload dense compute work from the graph processing cores to dense compute cores. There is a hardware managed queue that stores incoming offload instructions and monitors the current status of the pipeline and launches the instructions sequentially, enabling an easy offload mechanism for the software. Multiple graph processing core threads can each use the dense compute bandwidth of the dense compute cores by calling a new ISA function (e.g., by calling the dense.func) without worrying about the status of the dense core and whether other cores are using the dense core at the same time. The offload instruction can also allow efficient and simple passing of the program counter and operand addresses to one of the dense compute cores as well. The queue gives metrics through software readable registers (e.g., the number of instructions waiting (in a COUNT value)) and can help in tracking average waiting requests and other statistics for any dense core.

As noted above, a graph processing architecture may be particularly suited to operate on sparse workloads exhibiting a large number of random remote memory accesses and that are heavily network and memory bandwidth-intensive and less dependent on compute capability. To efficiently address this workload space, a graph processing architecture has a highly scalable low-diameter and high-radix network and many optimized memory interfaces on each die in the system. While this architectural approach provides efficient support for workloads that are truly sparse, providing a system with graph processing cores alone lacks sufficient compute performance to execute dense kernels (e.g., matrix multiply, convolution, etc.) that may be utilized in some application. To correct this performance gap, some systems incorporating a graph processing architecture may further include dense compute cores in addition to the graph processing cores, such as illustrated in the example of FIG. 6. In this example, eight dense compute cores (e.g., 605*a-h*) are incorporated into each die of a graph processing device (e.g., 602) to be incorporated in a system. In such implementations, kernel functions are offloaded from threads in the graph processing cores (e.g., 205*a-h*) to any dense core 605*a-h* in the system 602 via directed messages.

In one example implementation, the compute capability within each dense core is implemented with a 16×16 reconfigurable spatial array of compute elements or systolic array (also referred to herein as a "dense array (DA)"). In some implementations, the reconfigurable array of compute elements of a dense compute core may be implemented as a multi-dimensional systolic array. This array is capable of a variety of floating point and integer operations of varying precisions. In this example, such an array can, in total, at a 2 GHz operating frequency a single dense core can achieve a peak performance of 1 TFLOP of double precision FMAs. Respective dense cores may have a control pipeline responsible for configuring the DA, executing DMA operations to efficiently move data into local buffers, and moving data into and out of the DA to execute the dense computation. The specific characteristics (e.g., memory locations, compute types, and data input sizes) of the operations vary based on the corresponding kernel. These kernels are programmed by software and launched on the control pipeline at a desired program counter (PC) value.

In some implementations, graph processing cores within a system that also include dense compute cores may include a dense offload queue and corresponding hardware circuitry to perform offloads from the graph processing core to the dense compute core control. This offload pipeline is managed intelligently by hardware managed through the dense offload queues (DOQ) to thereby simplify programmability for the software offloading the dense compute. With full hardware management, there is no need for software to check for the idleness of the dense compute or having to manage the contents and ordering of the queue, among other example benefits. The hardware circuitry managing the DOQs may also handle passing of the required program counter (PC) information, the operand, and the result matrix addresses to the control pipeline in a simple manner, among other example features.

In some implementations, a specialized instruction in the graph processing architecture ISA may be provided as a handle for initiating a request to a dense compute core. For instance, the software may use a dense function ISA instruction (e.g., 'dense.func') to trigger the offloading of a task from a graph processing core to a dense compute core by sending an instruction packet over the network interconnecting the cores from the graph processing core to one of the dense compute cores. The request may include the address of the target dense compute core, which may be used by the network to route the packet to the appropriate dense compute core. The request packet may be received at the dense offload queue (DOQ) corresponding to the targeted dense compute core.

Figure 8:
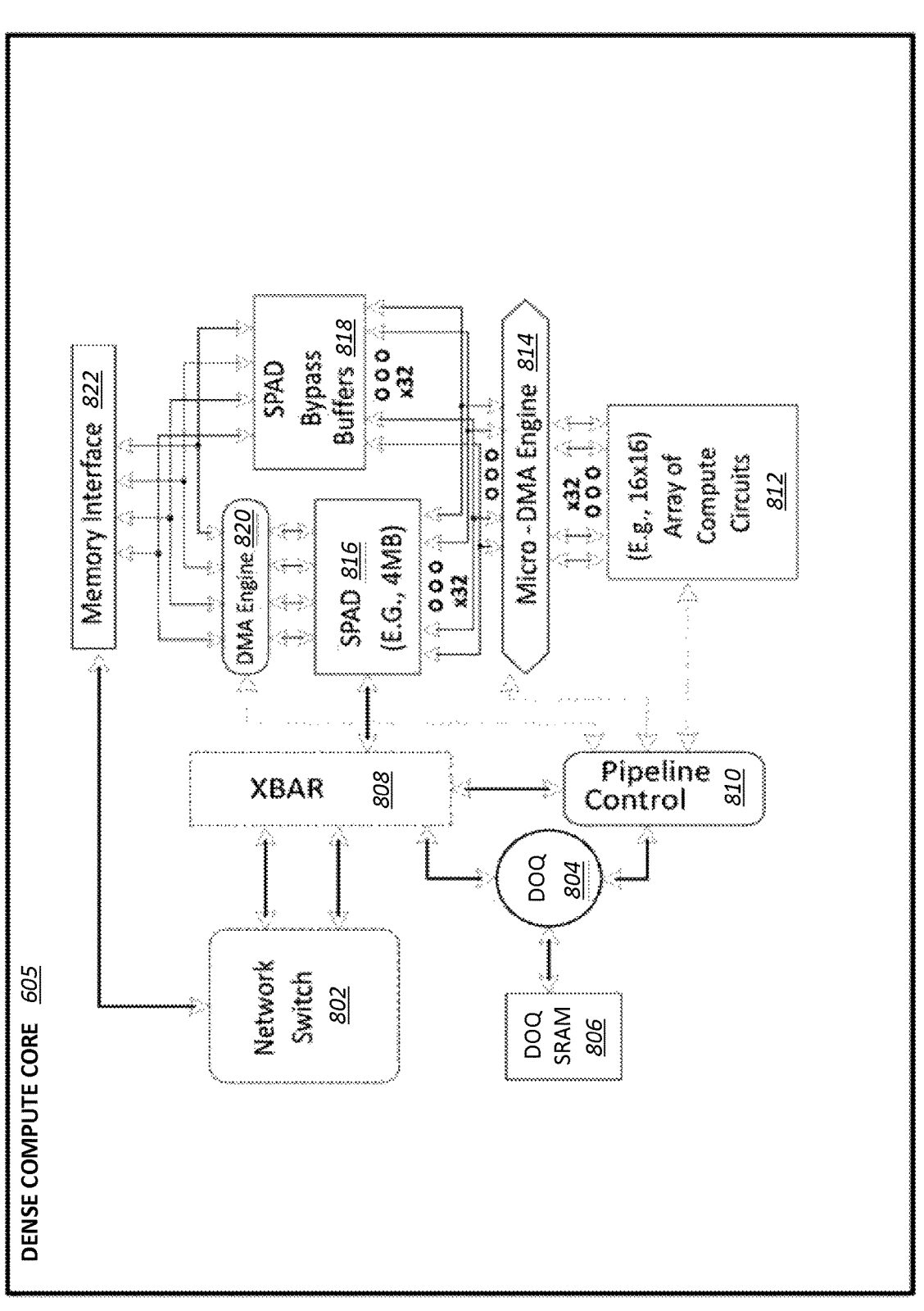
FIG. 8 is a simplified block diagram illustrating an example dense compute core.

Turning to FIG. 8, a simplified block diagram is shown illustrating an example dense compute core 605. Dense compute cores (e.g., 605) may include an array 812 of interconnected compute units, which provide the dense computing functionality of the dense compute core. In some examples, a 16×16 array of compute elements may be provided. A dense compute core 605, in one example implementation, may also include a dense offload queue 804 and control pipeline 810 and crossbar (XBAR) 808 to support the movement of data between the dense compute core and other components of the system (e.g., graph processing cores, memory controllers and associated blocks of shared memory, other dense compute cores, etc.). Logic for executing a dense offload instruction may be implemented as a decoder circuit and/or an execution circuit (e.g., execution unit) in the dense offload queue, the control pipeline, or other components of the dense compute core. Various instructions may be received for a dense computing core at its dense offload queue (e.g., 804).

In some implementations, control pipeline 810 may be implemented as a single-threaded pipeline for managing and orchestrating hardware of the dense compute core 605 for performing various functions. For instance, control pipeline 810 may configure the reconfigurable array of compute elements 812 in one of a variety of possible configurations, read data from local or remote memory (e.g., through DMA calls to shared memory), copy/write such data to local scratchpad memory 816 of the dense compute core for use by the array 812, load instructions corresponding to a set of functions, instructions, kernel, or other program (e.g., based on a program counter value) for execution by compute units in the array, move result data (e.g., data generated during execution of the dense workload offloaded to the dense core) from the dense compute core (e.g., from scratchpad (e.g., 816) to memory accessible to a graph processing core (e.g., through a remote atomic), update registers identifying progress of the workload execution by the array of compute circuits, among other example tasks and functions.

Dense offload queue 804 may be utilized to provide hardware-managed orchestration and monitoring of workloads offloaded to the corresponding dense compute core 605 (e.g., from a sparse-compute graph processing core). The dense offload queue 804 may maintain a hardware-based queue of received instructions, may identify when the control pipeline 810 (and compute array 812) are available to handle a next instruction in the queue, and monitor the status of the control pipeline and performance of functions associated with an offload request. In this manner, the dense offload queue 804 may simplify software development for platforms incorporating a mix of sparse graph processing cores and dense processing cores by implementing the orchestration and monitoring of offloaded dense compute tasks in hardware. For instance, a single instruction (e.g., a dense offload instruction (e.g., dense.func)) may be defined in the ISA of the platform to simply and elegantly allow hardware to manage offloading of tasks and the performance of these tasks by a corresponding dense compute core (e.g., 605). The dense offload queue 804 can cause or launch action by the control pipeline 810 including the performance of actions using in crossbar 808, DMA engine 820, and/or micro-DMA engine 814 to appropriately configure the dense compute core hardware to perform a set of particular tasks, kernel, or other program. In certain embodiments, memory interface 822 is coupled to a (e.g., system) memory, e.g., shared memory external from the dense compute core 605. In certain embodiments, other components (e.g., core(s)) are coupled to core 605 via network switch 802, such as other dense compute cores and graph processing cores, among other example elements.

In certain embodiments, a micro-DMA engine 814 is coupled to the array of compute circuits 812, a scratch pad memory 816 (e.g., memory address accessible), and/or a buffer 818 (e.g., not memory address accessible) that bypasses the SPAD. In one embodiment, local scratchpad (SPAD) 816 is used to hold data that is subject to high reuse and bypass SPAD buffer 818 is used for low-reuse to reduce offload latency. Thirty-two parallel input/output ports are used as an example, and it should be understood that other numbers of ports may be utilized, e.g., 64, 128, etc. In certain embodiments, micro-DMA engine 814 is not coupled to memory external to core 605 and/or is not part of a cache coherency hierarchy.

In some implementations, the array of compute circuits 812 of a dense compute core is implemented as a multi-element (e.g., 16 element×16 element) reconfigurable spatial array of compute circuits (e.g., a dense array (DA)) capable of a variety of floating point and integer operations of varying precisions (e.g., a grid of floating-point unit (FPU) and/or arithmetic-logic unit (ALU) blocks). The reconfigurability of the array of compute circuits 812 allows for multiple options for connectivity between its internal compute circuits. In certain embodiments, the connectivity is pre-configured in the array of compute circuits 212 before (e.g., kernel) execution begins. Embodiments herein utilize a reconfigurable array of compute circuits because (i) given optimal array configuration, it provides high compute efficiency for a subset of kernels under a variety of input and output matrix sizes, and the programmability of the DA (e.g., via the μDMA instructions) seamlessly integrates into an ISA (e.g., an ISA for the second core type) with minimal control pipeline modifications, among other example features and benefits.

Figure 9A:
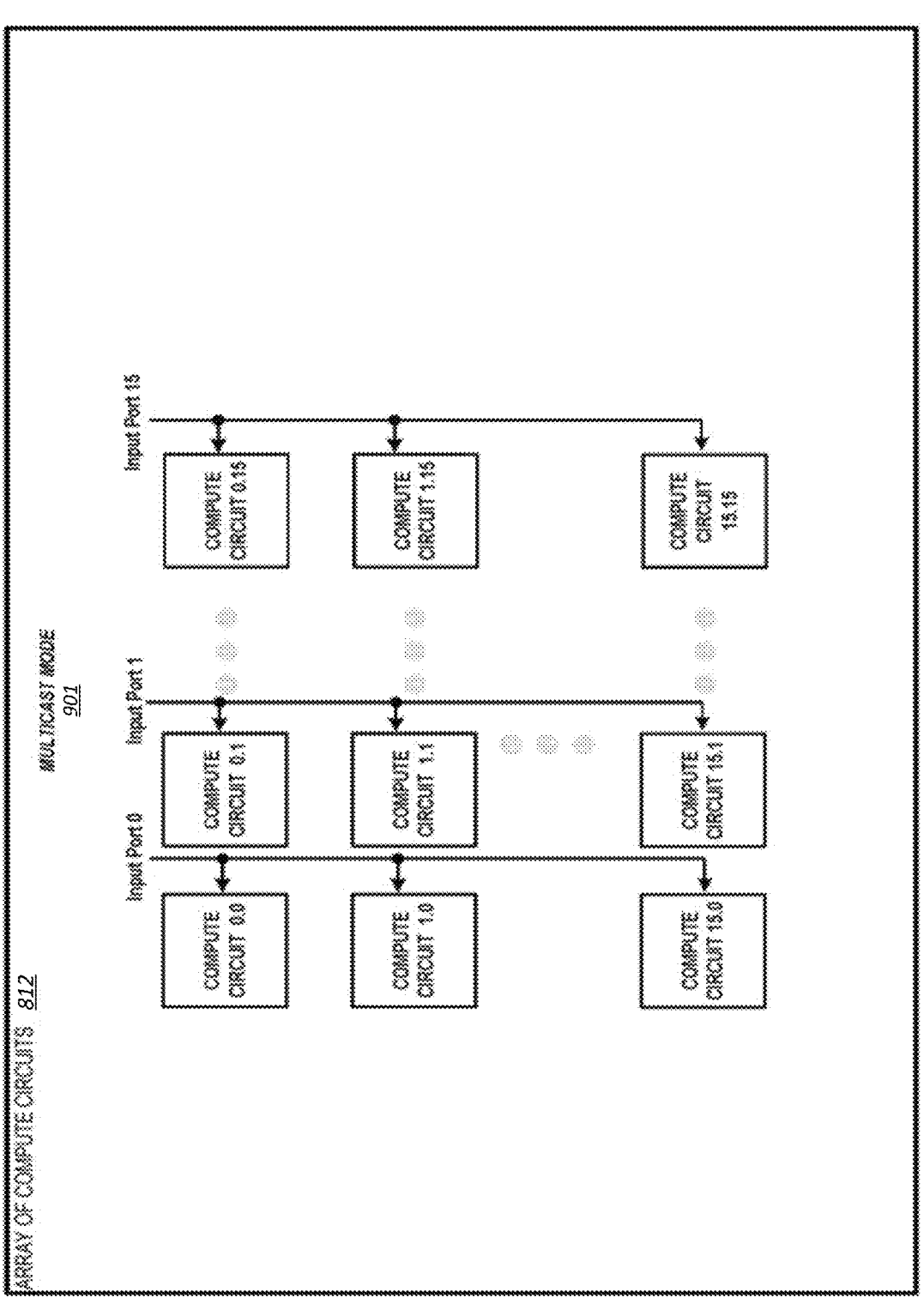
FIGS. 9A-9C are simplified block diagrams illustrates example reconfigurations of a compute array of an example dense compute core.
Figure 9B:
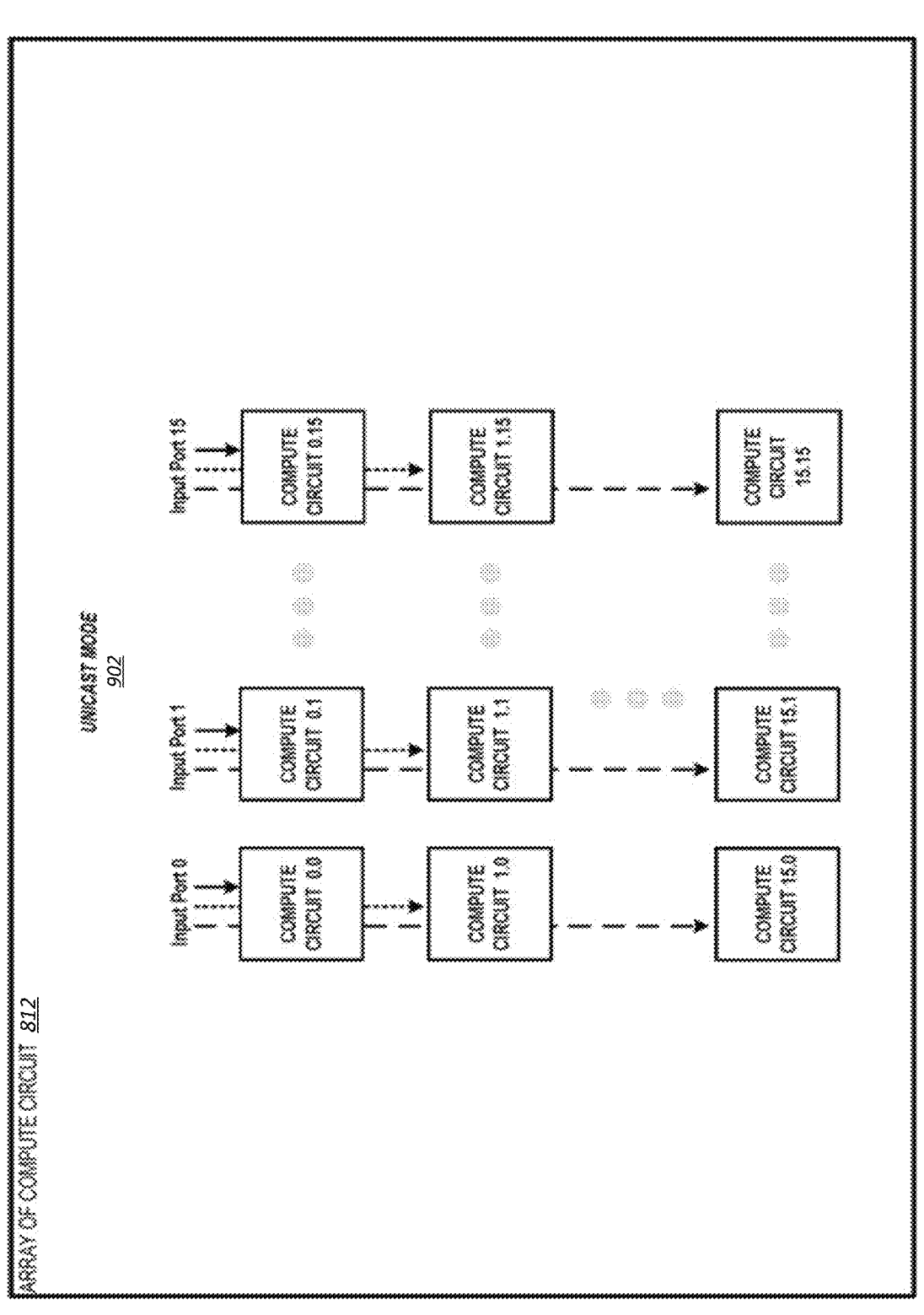
Figure 9C:
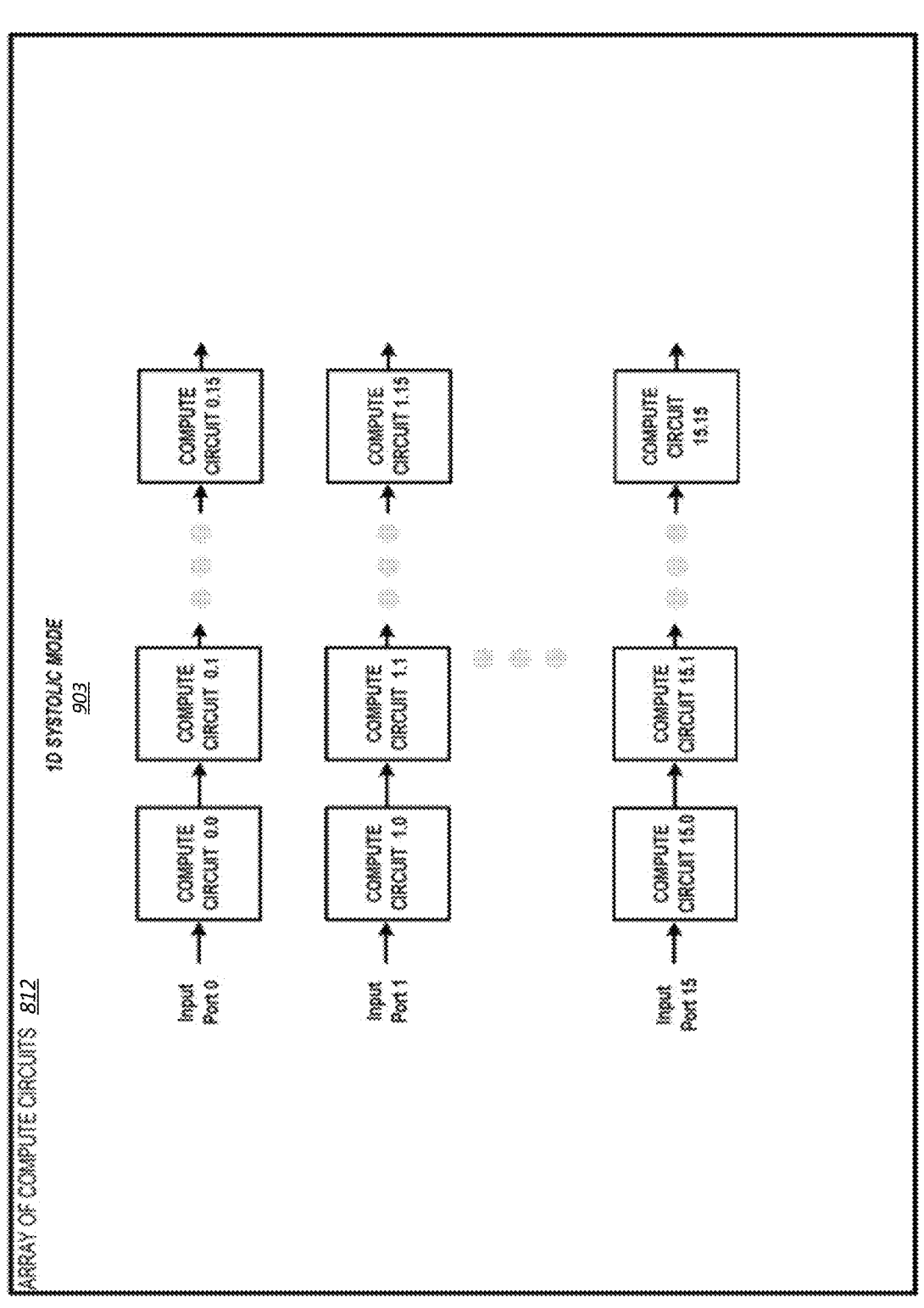

FIGS. 9A-9C illustrate example configurations of an example array of compute circuits, which may be programmed and implemented on an example dense compute core. For instance, FIG. 9A illustrates a block diagram of an array of compute circuits 812 in a multicast mode 901 according to embodiments of the disclosure. As depicted, the compute circuits are each indexed by a value (e.g., between 0 and 15 for each row and each column). In certain embodiments, an array of compute circuits 812 in a multicast mode 301 causes a same value (e.g., from a 1D array of input data) to be broadcast to a proper subset of compute circuits (e.g., shown as entire columns, but entire rows, or a subset of 2D blocks are possible in other embodiments), for example, a first value input to all compute circuits in the first row via input port 0, a second value input to all compute circuits in the second row via input port 1, etc.

FIG. 9B illustrates a block diagram of an array of compute circuits 812 in a unicast mode 902 according to embodiments of the disclosure. In certain embodiments, an array of compute circuits 812 in a unicast mode 902 causes a different value (e.g., from a 2D matrix of input data) to be sent to a respective compute circuits (e.g., shown as being performed on an entire row for each successive operation (e.g., cycle), but entire columns, or a subset of 2D blocks or all compute circuits are possible in other embodiments), for example, a first value input to compute circuit 0.0 in the first row via input port 0, a second value input to compute circuit 0.1 in the second row via input port 1, etc. for a first 1D array of a 2D matrix, then a first value input to compute circuit 0.0 in the first row via input port 0, a second value input to compute circuit 0.1 in the second row via input port 1, etc. for a second 1D array of a 2D matrix, and so forth.

FIG. 9C illustrates a block diagram of an array of compute circuits 812 in a one-dimensional (1D) systolic mode 903 according to embodiments of the disclosure. In certain embodiments, an array of compute circuits 812 in one-dimensional (1D) systolic mode 903 causes a different value (e.g., from a 1D array of input data) to be sent to a respective compute circuits (e.g., shown as being performed on first compute circuits in a first column, but other columns, or rows are possible in other embodiments), for example, a first value input to compute circuit 0.0 in the first column via input port 0, a second value input to compute circuit 1.0 in the first column via input port 1, etc. for a 1D array.

To achieve the optimal combination of ease of programmability and high compute performance through an array of compute circuits, embodiments herein utilize a DMA engine (e.g., micro-DMA engine) to provide the following features: (i) flexibility in the input/output matrix characteristics (e.g., configurability of row and/or column dimensions as well as the organization of the data structure in memory (e.g., row major or column major)), (ii) supporting the method of data movement and memory access patterns for multiple modes of the array (e.g., multicast, unicast, or systolic mode), and (iii) providing high parallelism at each array input/output to hit the highest performance.

The dense offload queue 804 manages incoming dense function requests passed from graph processing cores in a system. For instance, when a dense function request is received, the DOQ 804 will store it in its local memory buffer (DOQ SRAM 806). Whenever the control pipeline 810 has completed execution of the previous kernel and becomes free (or immediately if its already free), the DOQ 804 pops the function from its queue and launches the corresponding thread on the control pipeline 810. Accordingly, in some implementations, the DOQ 804 is responsible for both queue pointer management in the dense compute core, as well as serializing and launching the dense functions in the order that they were received and monitoring the status of the control pipeline 810 to determine when they need to be popped off the queue. Further, the DOG 804 can load the matrix addresses passed along with a dense functional instruction call (e.g., dense.func) into the register file of the control pipeline 810 and thus enables the control pipeline ease of access to this data, among other example functions.

Figure 10:
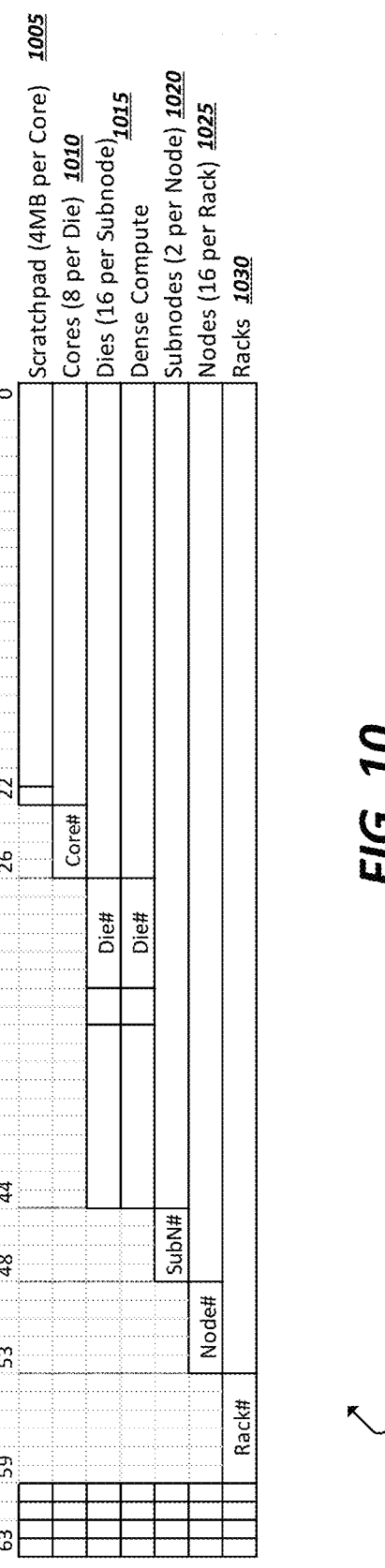
FIG. 10 is a representation of an example memory map of an example graph processing system.

FIG. 10 is a diagram representing an example memory map 1000 utilized in a system including a set of graph processing cores and dense compute cores. Such systems may be further interconnected with other devices (included other instances of similar graph processing devices) in various system topographies. For instance, a first portion 1005 of the memory address space may correspond to a core's local scratch pad, with a second portion 1010 of the memory map dedicated to identifying the specific core (e.g., graph processing core, dense compute core, or other core provided on the system). In one example, eight cores may be provided per die and sixteen dies may be provided per compute sub-node. Accordingly, a third portion 1015 of the memory map may be reserved to address dies (which may be addressed differently between graph processing dies and dense compute dies) and a fourth portion 1020 reserved for subnode addressing. In some implementations, two or more subnodes may be provided per node and nodes may be interconnected on a server rack. Still further, multiple server racks may be interconnected in a network to further expand the overall graph compute capacity of a system, and so on. As illustrated in FIG. 10, corresponding portions (e.g., 1025, 1030) may be provided for addressing at the node, rack, and even system levels, among other examples corresponding to other network topologies.

As noted above, a system or network of interconnect graph processing cores, dense processing cores, other processors, memory elements, accelerators, and other devices may be interconnected within a system. Such a system may be at the chip level (e.g., an SoC), board-level, rack-level, or enterprise network level (e.g., with the devices connected in a data center environment). Such networks may be built from a combination of links and switches. The interconnect elements may be resourced limited in terms of the bandwidth, and such resource limitations may be governed through buffers for use in organizing communication within the network. In some instances, device buffers may be fixed in size, according to the capabilities of the corresponding device. Further, flow control protocols may be defined for use on various links and switches within the network, including query-based and credit-based flow control schemes, among other examples. While such networking protocol and flow control may be effectively implemented at the hardware level to enable high-speed and efficient collaboration between interconnected devices, such communications may be difficult to simulate within software-based simulation systems, particularly as the number of connections, devices, compute pipelines, etc. being modeled increase in number in accordance with the modeling of complex real-world computing systems.

Figure 11:
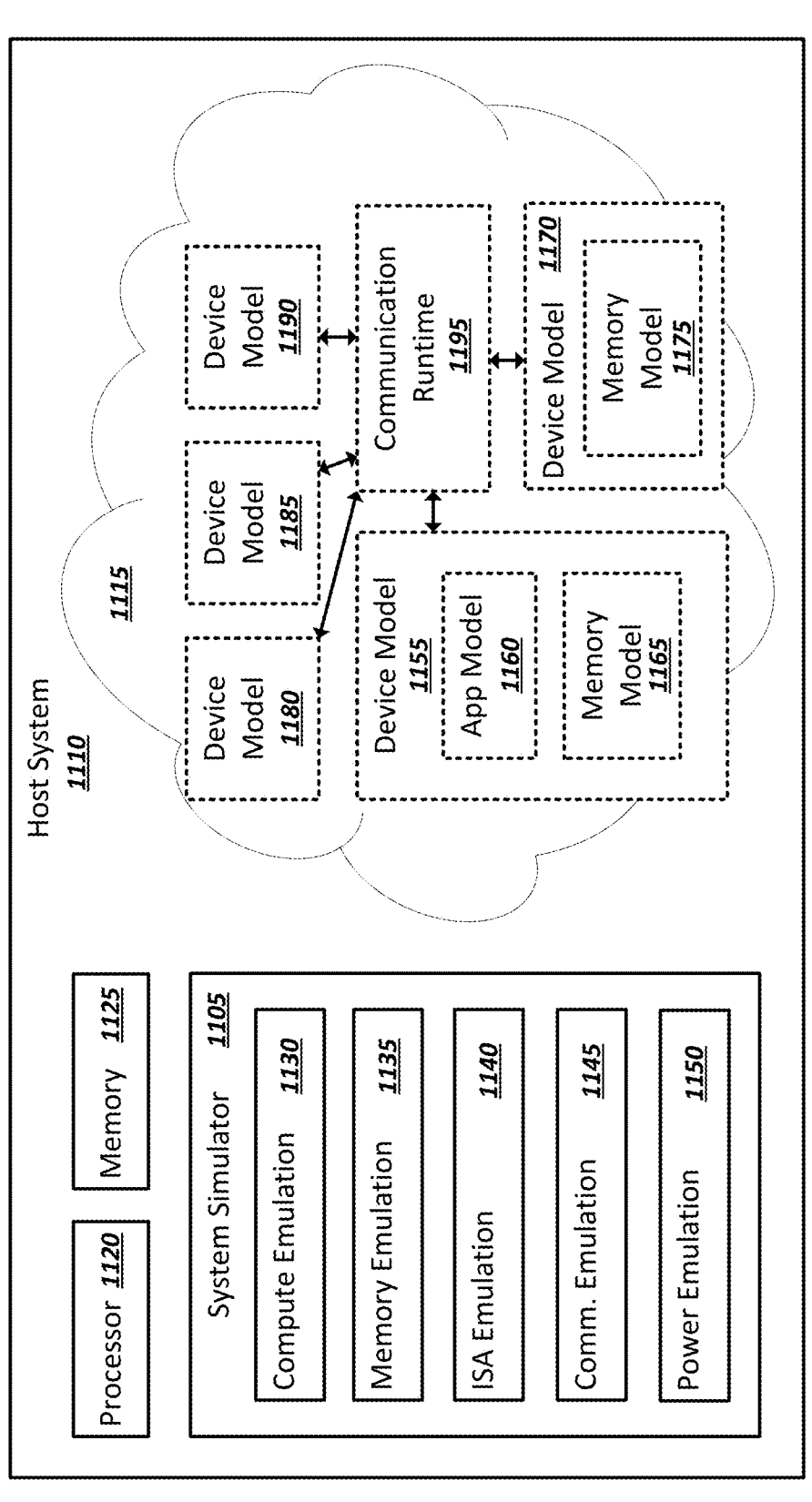
FIG. 11 is a simplified block diagram illustrating an example system simulator.

FIG. 11 is a simplified block diagram 1100 illustration an example system simulation system. A system simulator 1105 may be hosted on one or an interconnected-combination of physical host devices (e.g., 1110) and may be composed of models and libraries used to simulate various devices, communications between the devices, operating systems and instruction sets running on the devices, and so on. Applications, instructions, and programs may be effectively run on a virtual system 1115 emulated using the system simulator 1105 to test the performance of the simulated system, to assist in software development for the system, prototyping, and other uses. A host system 1110 may include one or more data processor devices 1120 and one or more memory elements 1125 to implement system memory of the host system 1110. The host system 110 may thereby allocate system resources for and execute the system simulator 1105. An example system simulator 1105 may have logic to access various models, data structures, and libraries to construct simulated, or virtual, representations of various entities and functionality of a real or proposed "target" system to be modeled using the system simulator 1105. For instance, the system simulator 1105 may include compute emulation logic 1130 to emulate various hardware characteristics of computing elements, such as central processing units, graphical processing units, accelerators, execution units, and so on. The system simulator 1105 may also possess a memory emulator 1135 to simulate aspects and performance of memory devices and subsystems. The system simulator 1105 may include instruction set architecture (ISA) emulation 1140 and communication emulation logic 1145 to define and emulate execution of one or more instruction sets and support simulated communication between the virtualized entities. Additional aspects of devices may also be simulated, including power characteristics (e.g., using power emulation 1150), environment emulation (e.g., to simulate environment characteristics that could impact system or device performance), among other examples.

Emulation logic and corresponding models of a system simulator may be utilized together to generate various virtualizations, or models, of elements of a target system. For instance, a particular device model (e.g., 1155) may be built using a computer processing model and emulation (e.g., to simulate one or more processing cores embodied in a corresponding component (e.g., in a System-on-a-Chip (SoC) configuration) and any processor-related support circuitry (e.g., bridging interfaces, etc.)) of the target system. Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which various device components may interact (e.g., at different speeds, on different buses, etc.). Processing logic may further simulate execution of various instructions (e.g., of a program or application 1160 provisioned to run on the simulated device). Instructions may include program code configured to cause processing models to perform activities related to reading data, writing data, processing data, formulating data, converting data, transforming data, etc. A device model 1155 may also include modeling of local memory (e.g., 1165) of the device, such as random access memory (RAM) of the device, memory utilized to implement register or buffers for the device, etc. Memory emulation and memory models may further simulate additional memory elements and subsystems within a target system including, for example, RAM, read-only memory (ROM) in a fixed or removable format. RAM may include volatile memory configured to hold information during the operation of a simulated target system (e.g., 1115) such as, for example, static RAM (SRAM) or Dynamic RAM (DRAM). ROM may include non-volatile (NV) memory modules configured based on BIOS, UEFI, etc. to provide instructions when simulation of the system is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, among other examples.

As illustrated in the example of FIG. 11, a system simulator 1105 may launch and execute a simulation 1115 of a target system on the host system(s) 1110. Potentially any computing system device may be modeled and interconnected within the simulation 1115. For instance, in the example illustrated in FIG. 11, a set of devices modeled by corresponding device simulation models (e.g., 1155, 1170, 1180, 1185, 1190) may be interconnected and their collaborative operations and interactions simulated using the system simulator 1105. In some implementations, the system simulator 1105 can launch a communication runtime 1195 (e.g., using communication emulation engine 1145), which is to interface with device models (e.g., 1155, 1170, 1180, 1185, 1190) in the simulation to facilitate the transmission of data (e.g., packets, flits, etc.) between the simulated devices. A communication runtime 1195 may define a protocol including a library of messages that may be called by other software processes, programs, or models, such as those used to implement various device models in a simulation. The communication runtime 1195, itself, may be embodied as one or more software processes or programs, which executes to interact with other software processes as well as manage memory allocated to the communication runtime, including memory for use as internal buffers of the communication runtime. As at least some of the devices represented by the models (e.g., 1155, 1170, 1180, 1185, 1190, etc.) would be connected via electrical or optical connections, the communication runtime 1195 effectively simulates these physical channels, as well as aspects of the interfaces of the devices coupling the devices to these links, among other example implementations.

Figure 12:
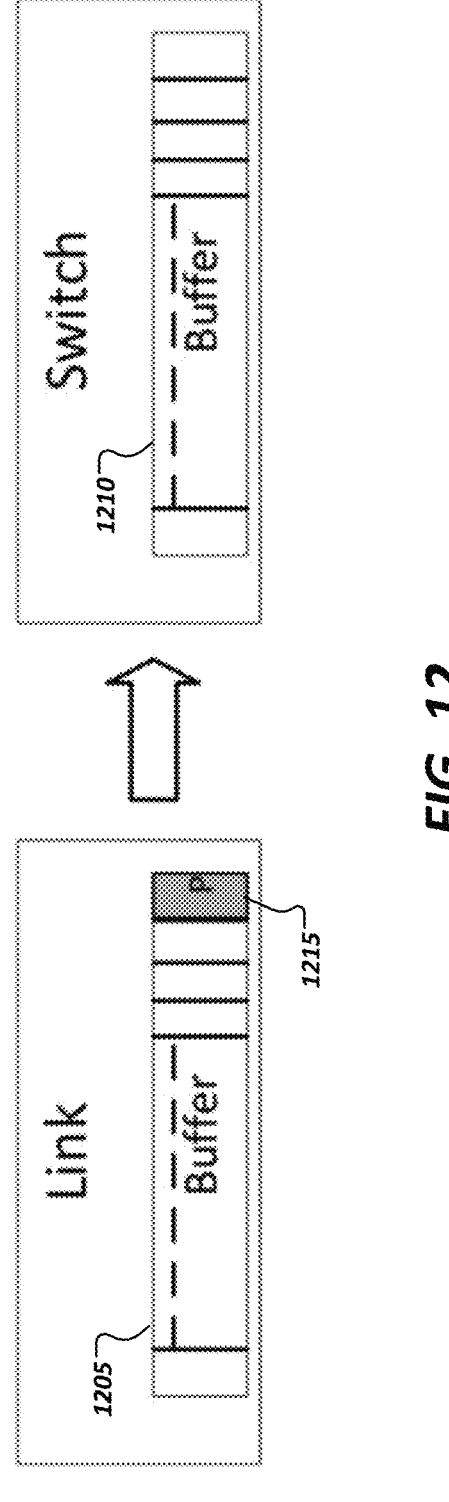
FIG. 12 is a simplified block diagram representing example transmit and receive buffers.

In some implementations, devices simulated by the system simulator may be implemented in the real world with fixed-size buffers for use in sending and receiving data over links. For instance, a device may have one or more receive buffers and one or more transmit buffers. Indeed, a device may be provided with multiple buffers to send and/or receive data corresponding to one of potentially multiple different operations, classes, or types. In a simulation of such devices, a device model (e.g., 1155, 1170) may include models of such buffers (e.g., implemented using respective memory models (e.g., 1165, 1175), or other simulation logic). Turning to FIG. 12, a simplified block diagram 1200 is shown illustrating example buffers in a network, such as a link buffer 1205 (e.g., maintained by a device coupled to a link) and a switch buffer 1210 (e.g., maintained by an intermediate switch in an interconnect coupling two or more devices in the system. Packets (e.g., 1215) move through these buffers from source to destination. Because the buffers are of fixed size, it is important for the sender (e.g., 1205) to know upfront if the receiver (e.g., 1210) has enough buffer capacity to receive a packet 1215, to avoid creating any deadlocks. In hardware, this is achieved through various network flow control techniques, often defined in an interconnect protocol associated with the link. In practice, these flow control techniques are designed and optimized for hardware. Simulating the hardware-based flow control in a software system simulation can end up negatively impacting performance of distributed/parallel system simulators, given the relative inefficiency of the software simulation's ability to mimic the speed and implementation of hardware-based flow control. In an improved implementation, an improved novel network flow control scheme may be implemented in software-based system simulations and may be particularly advantageous in modeling flow control within high performance distributed parallel simulation frameworks using the software simulator. Such simulations may be useful in simulating implementations of massive multithreaded cores and multi-core systems built using such devices, such as introduced above, among other example systems.

Figure 13:
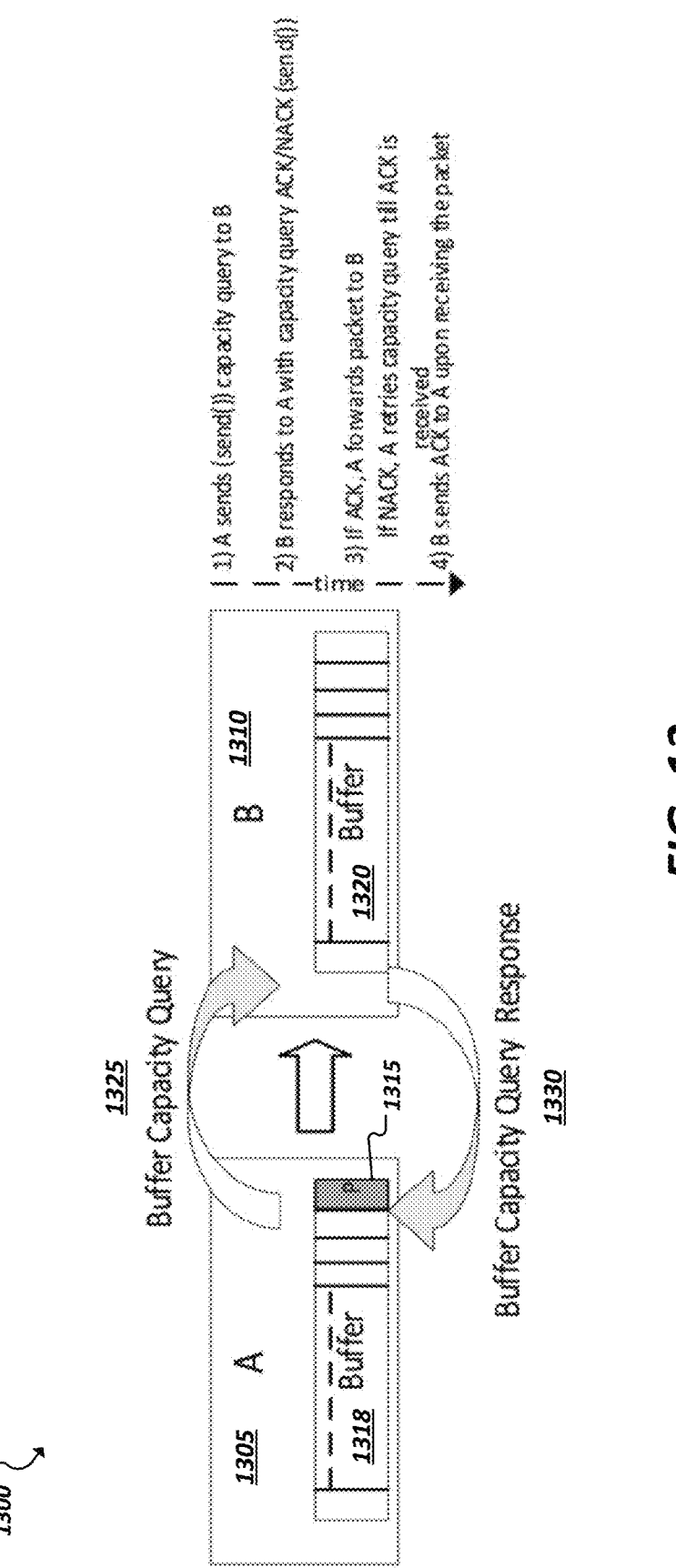
FIG. 13 is a simplified block diagram illustrating an example query-based network flow control technique.

Traditionally, in the simulation of network elements and network traffic within a simulation of a computing system, the most straightforward network flow control scheme to implement is a query-based scheme. FIG. 13 is a simplified block diagram illustrating the basic principals of such a network flow control scheme. In query-based flow control, agent A 1305 sends a capacity query 1325 to agent B 1310 before sending 1310 an outgoing packet 1315 (from its transmit buffer 1318). Agent B responds 1330 with an ACK if there is buffer space (e.g., at 1320) available, otherwise it sends a NACK. Agent A 1305 continually retries this capacity query until an ACK is received. Upon receiving the ACK, agent A 1305 sends the packet to agent B 1310, and upon successfully receiving the packet, agent B 1310 responds with an ACK.

Figure 14:
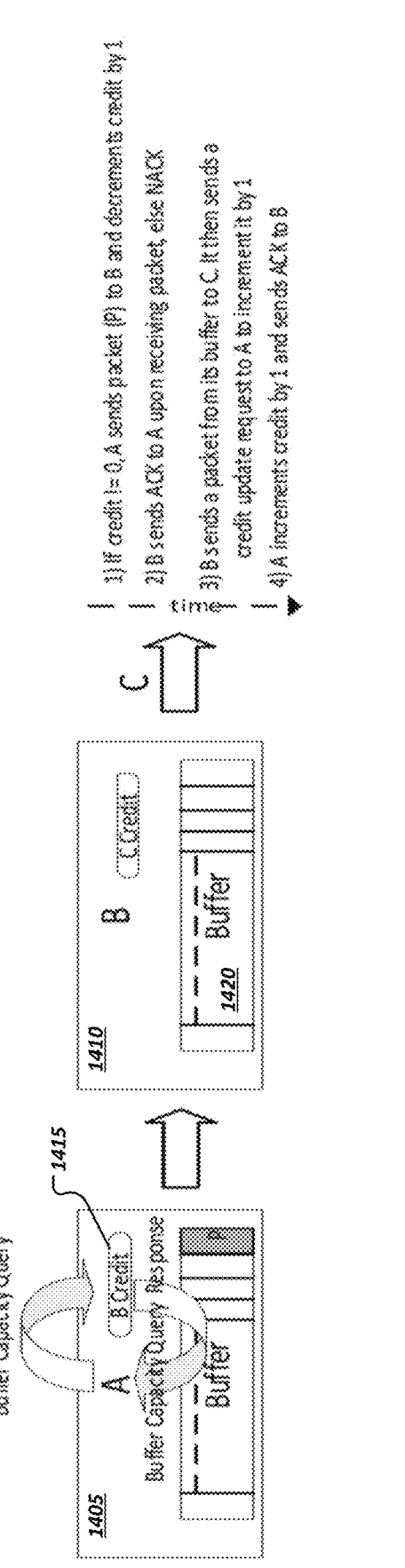
FIG. 14 is a simplified block diagram illustrating an example credit-based network flow control technique.

Credit-based flow control is another popular flow control scheme used in system simulators (e.g., Gem5™ Garnet™). FIG. 14 includes a simplified block diagram 1400 illustrating an example credit-based flow control scheme. In some implementations of hardware being simulated, there are physical 1-bit wires to facilitate fast query processing (e.g., one cycle) in the real-world hardware implementations. Accordingly, in a real-world credit-based scheme, each agent (e.g., 1405, 1410) maintains individual credits (counters), which track free slots in the entities it is connected to. As shown in FIG. 14, agent A 1405 maintains a credit 1415 to track free slots in agent B 1410. If a credit value 1415 is non-zero, agent A 1405 sends the packet to agent B 1410, and the credit 1415 is decremented by one to indicate that agent B has one less free slot (e.g., in its buffer 1420). Agent B 1410 then acknowledges the reception of the packet. When agent B further sends the packet from its buffer 1420 to another agent C, it frees up a slot in agent B's buffer 1420. Agent B then sends a signal (e.g., broadcast) to all the entities that feed into it, to increment their respective credit (e.g., 1415) by 1—indicating that agent B 1410 has freed a slot in its buffer 1420. Again, to speed up signaling, 1-bit physical wires can be built into hardware to make the credit returns and other signaling related to a hardware-based flow-control implementation high-speed and efficient.

Unlike in hardware, where physical wires are used to accelerate communication in traditional flow control schemes (e.g., for query or credit update signals), simulating such communication using software models is substantially more expensive from a computational perspective, particular in systems where many computing entities are modeled and interconnected. Such computing entities can be threads in the same process, or different processes. Intra-process signaling and communication between two entities can be achieved via a shared variable or Posix thread signaling, and inter-process communication between two entities can be performed in the system simulator via distributed comm protocols like TCP/IP (Unix Socket), Message Passing Interface (MPI), InfiniBand™, Lightweight Communication Interface (LCI), etc. In some implementations, each intra-process communication modeled in the system simulation can take 10-100 clock cycles and each inter-process comm can take 1000s of clock cycles (e.g., where exponentially fewer cycles are used in the corresponding hardware implementation).

Modern system simulators, such as illustrated in the example of FIG. 11, may be implemented as complex distributed high-performance computing (HPC) programs (e.g., multi-process and multi-threaded) designed to simulate data center-scale clusters (composed of thousands of machines/devices) as fast as possible. Large scale simulations are becoming a common method in designing new cloud solutions and new data centers. In some cases, large scale simulations may include simulations of systems utilizing platforms and architectures similar to those discussed and illustrated above in the examples of FIGS. 2B, 4, 6, and 7, among other examples. It is critical to enable customers to simulate data center scale machines with simulation speed sufficient to analyze real workloads, while using reasonable amounts of compute resources. Inter-process communication is a frequent bottleneck of such system simulators, and deliberate efforts are made to minimize it. In a distributed framework, a query-based network control protocol can be naively built using fundamental communication calls like send( ) and recv( ). However, each query results in two send( ) calls and two corresponding recv( ) calls at minimum. The sender might have to perform several queries to send a single packet, resulting in additional communication overhead. Query overheads become worse as network contention increases (e.g., requiring an increased number of queries to get a free slot) and processes modeling the end points get scheduled across the compute cluster leading to additional performance decay (e.g., inter-process comm latency degrades as processes get scheduled far apart in a compute cluster). For this reason, query-based flow control does not perform well in large scale system simulators.

Simulators are often sped up by using fully connected network topology (all-to-all) in which each simulated core can directly communicate with other cores of the simulated system. When relying on credit-based flow control, this strategy requires that each source core maintains a separate credit for all other simulated cores, and that each destination core is responsible for keeping all source core credits (that track its buffer capacity) in tight sync. This results in a need for frequent use of expensive system-wide broadcast/multicast operations, which are commonly known to impede scalability in HPC workloads, ultimately hampering simulator performance at scale. Accordingly, credit-based flow control also suffers from deficiencies in simulating such large-scale systems.

In an improved implementation of a system simulator, a no-query push network flow control scheme may be utilized that is tailored for high performance distributed simulators. It should be appreciated that, although such a no-query push network flow control scheme may be particularly advantageous within a system simulator environment, that no-query push network flow control is not so limited and may be employed as a runtime flow control scheme (in software or hardware) or in software modeling that falls outside of full system simulation, among other example applications. Indeed, while much of the discussion below focuses on the use of no-query push network flow control within system simulators and simulations, it should be further appreciated that these example implementations are provided as example applications of no-query push network flow control only and that any compute entities (real world or virtualized) can be provided with functionality to support and make use of no-query push network flow control on a communication channel or link, among other examples. Indeed, the features and flows of no-query push network flow control discussed may be seamlessly implemented within any computing system (e.g., with endpoint entities interfacing with an intermediary entity providing a resizable communication buffer such as or similar to a communication runtime, etc.).

Figure 15:
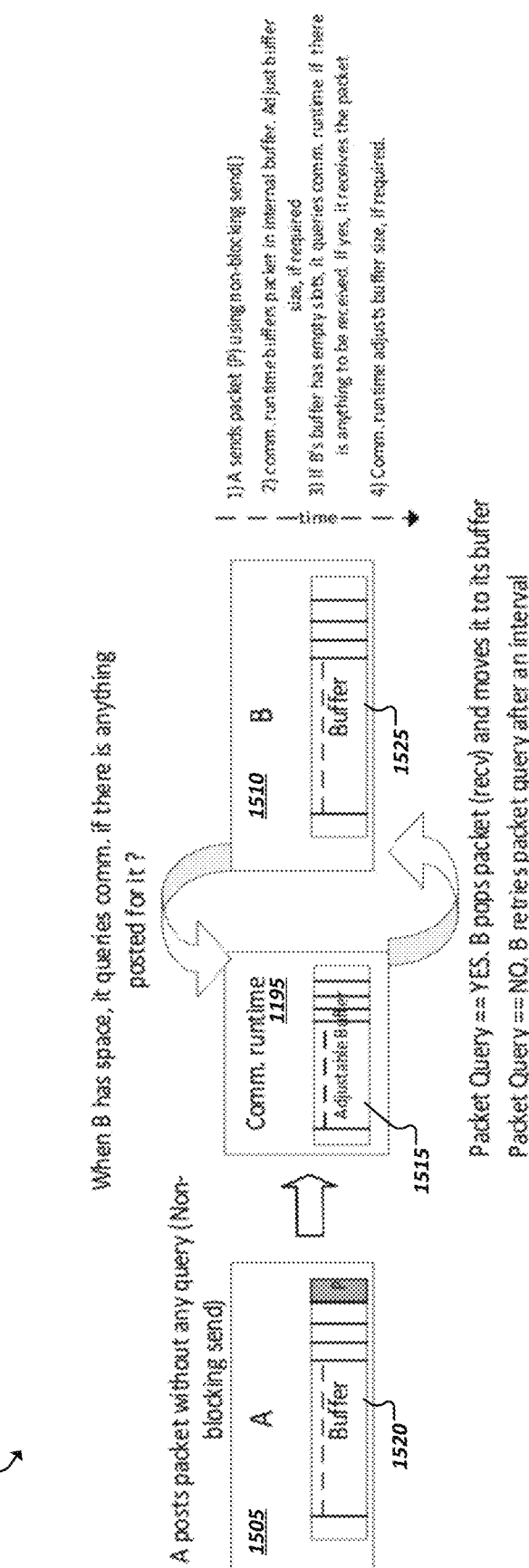
FIG. 15 is a simplified block diagram illustrating an improved no-query push-based network flow control technique.

FIG. 15 is a simplified block diagram 1500 illustrating the example implementation of such a flow control scheme. The no-query push flow control scheme may likewise omit the use of credit checks, with a source agent A 1505 pushing its outgoing packets onto the link as simulated by a communication runtime 1195 using its resizable internal buffers 1515, allocated as system memory and managed by the runtime. Whenever a destination agent 1510 has free buffer capacity, the destination agent 1510 checks with the communication runtime 1195 for an incoming packet destined for the corresponding destination device and pulls or otherwise receives these packets (from the communication runtime buffer 1515) at the destination agent in the simulation. These packets may remain queued in the internal communication runtime buffers 1515 until they are received (e.g., and acknowledged) by the corresponding destination agent 1510. The resizable nature of the communication runtime buffer 1515 (e.g., as opposed to the fixed buffer sizes of the source and destination device models, which are to model the real-world fixed nature of these buffers (e.g., 1520, 1525)), allow the system simulator to dynamically resize the communication runtime buffer(s) 1515 as needed, based on the number of connections and traffic being simulated. In some implementations, the system simulator may be equipped with good drainage characteristics (e.g., mechanisms to reduce congestion and route traffic efficiently), which can assist in keep these internal communication runtime buffers 1515 from growing unreasonably in size and putting pressure on the system memory, among other example features.

In an example no-query push flow control scheme, such as introduced in the example of FIG. 15, unlike other network flow schemes, the sender entity/agent is not required to check for buffer capacity at the destination prior to sending data on the communication channel. A no-query push flow control scheme leverages communication layer (e.g., communication runtime) packet buffering to push decision making to the destination, allowing the sender to send a packet without worrying about buffer space at the destination. Shifting the decision making to the destination agent eliminates any sort of redundant communication (send/recv or broadcast) otherwise required to track destination buffer capacity, thereby making it a highly performant software-based network flow scheme crafted for high performance system simulators. For instance, this modification decreases query communication/credit synchronization between source and destination entities, which can otherwise generate additional expensive communication calls (e.g., send( )/recv( ) calls) and/or collective operations (e.g., broadcast, multicast, etc.). In one example, a backpressure scheme may be defined for the data center system being simulated, such as sender entities partitioning their buffer capacity by operation type to ensure each sender only has a fixed number of requests in-flight for each operation type at a given time, among other example backpressure schemes. Such backpressure schemes may be supplemented in simulations using a no-query push flow control scheme, such as discussed herein, to assist in making the software-based simulation of hardware more realistic, among other example motivations. Indeed, in the absence of a backpressure mechanism exerted by the destination entity, sender entities are not directly blocked in sending the packet to the destination. This streamlining of communications is facilitated by the no-query push flow control scheme, which, in some implementations, can improve simulation speed by 2-3 orders of magnitude, with even higher gains observed in communication intensive workloads, among other example benefits.

Figure 16:
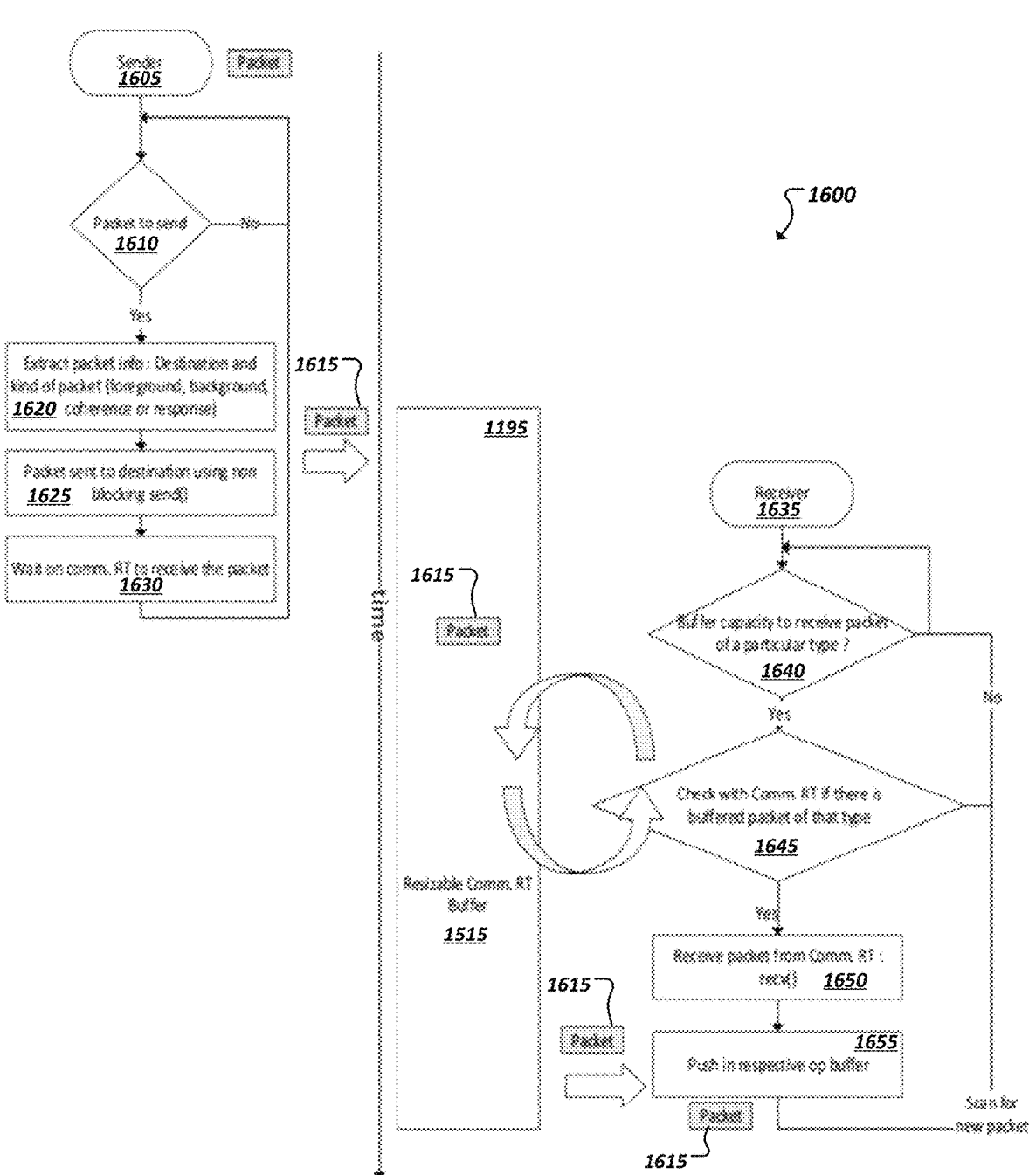
FIG. 16 is a simplified flow diagram illustrating performance of an improved no-query push-based network flow control technique.

FIG. 16 is a simplified flow diagram 1600 illustrating example flow control techniques associated with using no-query push flow control in the communication of a packet from a sender entity (e.g., device model) to a destination entity (e.g., receiving device model). A sender entity (and agent) 1605 can loop 1610 to check if there is a packet that needs service to be routed to a particular destination in a simulated system. When a packet 1615 is identified for sending, the sender entity 1605 can extract 1620 the packet information, including the destination of the packet, the type of packet, the operation associated with the packet (e.g., foreground, background, coherence, or response), and other information. The packet 1615 may be held in a (simulated) fixed-size transmit buffer of the sender entity. The sender entity 1605 can send 1625 the packet 1615 to the destination without first determining whether the destination has resources (e.g., buffer space) to accept the packet by routing the packet through the communication runtime 1195. In one example implementation, the simulated sender entity 1605 may communicate the packet to the communication runtime using a non-blocking send call. A non-blocking send can ensure that the sender entity does not get blocked while the packet is transmitted and received by the communication runtime. In some implementations, the sender entity 1605 may continue to hold 1630 the packet in its transmit buffer even after sending the packet 1615 to the communication runtime 1195 until the sender entity 1605 receives a confirmation or acknowledgement from the communication runtime 1195 that the packet 1615 has been successfully received and buffered in the internal buffer 1515 of the communication runtime. For instance, the communication runtime may send an acknowledgement message and, in response, the sender entity 1605 may reclaim the buffer slot in its transmit buffer used for the packet 1615.

Upon being received at the communication runtime 1195 and buffered in its internal buffer 1515, the packet may reside in the internal buffer 1515 until the corresponding destination entity claims/receives it. The communication library or simulation system (e.g., implementing its own communication protocol) may dynamically scale the capacity (up or down) of the communication runtime buffer 1515 based on the number and/or size of the packets sent but waiting to be received. In some implementations, a single communication runtime 1195 may be provided for each connection in the simulated system. In other implementations, a communication runtime may be provided to manage (and buffer packets of) multiple (or even all) connections between multiple different simulated entities within a system simulation.

The receiver entity 1635 may be empowered within a no-query push flow control scheme to dictate when it receives/pulls packets, which have been sent by various sender entities (e.g., 1605) and buffered in the internal buffer 1515 of the communication runtime buffer 1515 simulating the links that would couple corresponding devices in a real world system. The receiver entity 1635 may periodically or continuously check 1640 if it has buffer capacity in its simulated receive buffer(s). When it determines that it has receive buffer capacity to accept a new packet, the receiver may query 1645 the communication runtime 1515 to determine whether any packets are in the communication runtime's internal buffer 1515 which name the destination entity as its destination. When a packet is identified in the communication runtime's internal buffer 1515 for the particular destination receiver entity 1635, the receiver entity 1635 may pull or otherwise receive 1650 the packet(s) from the communication runtime 1195. In one example, the query 1645 of the communication runtime by the receiver entity 1635 may include a probe call by the receiver entity, which results in an identifier of the buffered packet being returned to the receiver entity. The receiver entity may then request the packet through a blocking receive call, or other receive call, to have the communication runtime deliver the packet to the receiver entity. The receiver entity may then perform further actions on the packet based on the models defining the simulated logic of the receiver entity, or based on an application or other program run on the simulated device, among other examples. In some implementations, such actions may be triggered by pushing 1655 the received packet into the corresponding receive buffer associated with the operation type of the packet, among other examples. This process may continue with the receiver entity opportunistically pulling packets destined for the receiver entity, but stored in the communication runtime's internal buffer, as the receiver entity identifies corresponding receiver buffer capacity.

In some implementations, the receiver entity 1635 may maintain multiple receive buffers, each corresponding to a respective type or operation (tag). In determining whether it has receive buffer capacity corresponding to the buffer associated with a respective tag, the receive entity 1635 may target its query 1645 of the communication runtime to determine whether packets of that corresponding tag/type are present in the communication runtime's internal buffer 1515 that are also destined for the receiver entity 1635. Such queries 1645 may only be performed when the receiver entity is in a position to receive new packets, thereby minimizing the number of query calls the receiver entity is likely to make of the communication runtime, among other features. This destination-side process may incur significantly lower overhead compared with traditional flow control schemes requiring the sender to query and track the buffer capacity of the receiver or synchronizing credits to determine receiver capacity.

In some implementations, a system simulator may be provided with drainage features to efficiently manage network traffic, and simulated end points (e.g., simulated entities such as cores, memories, accelerators, co-processors, etc.) can process requests using a no-query push flow control scheme with sufficient speed to minimize queuing delays which directly affect simulator performance. This ensures that packets do not spend excessive time in any buffer waiting to be received, except for a case when deadlocks in the simulated workloads create significant communication hotspots. This can work to ensures that the internal buffers 1515 of the communication runtime 1195 do not grow very large in size, thereby minimizing pressure on system resource induced by the network scheme.

Figure 17:
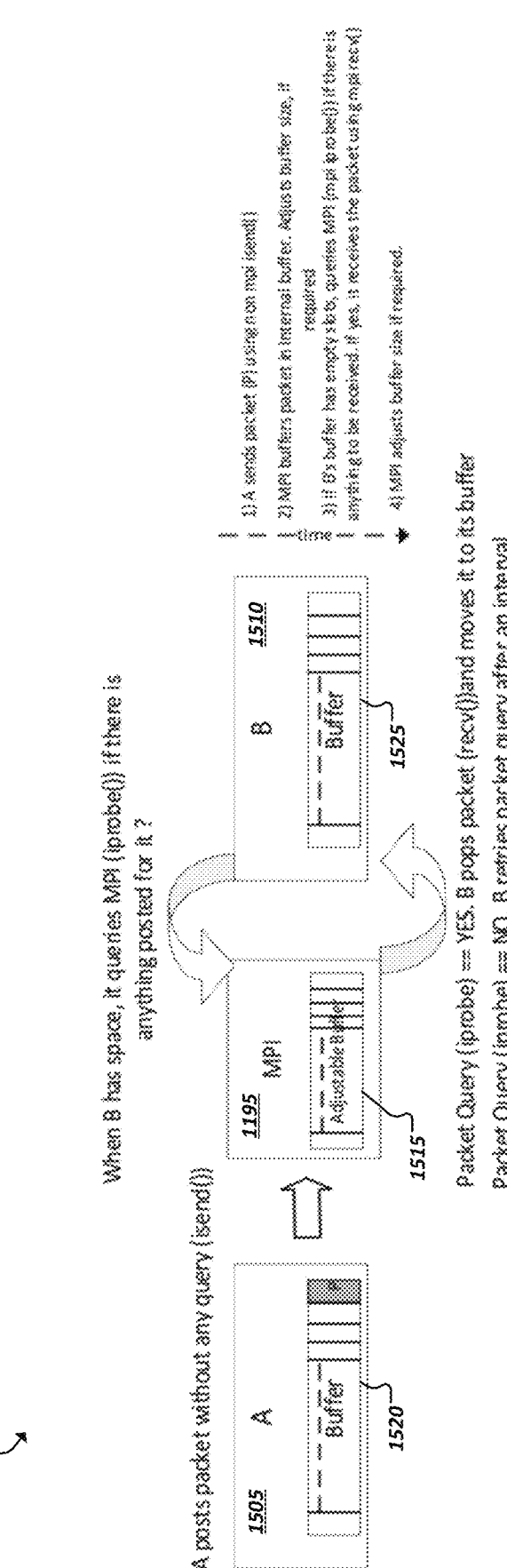
FIG. 17 is a simplified block diagram illustrating use of an example Message Passing Interface (MPI)-based implementation of a no-query push-based network flow control technique.
Figure 18:
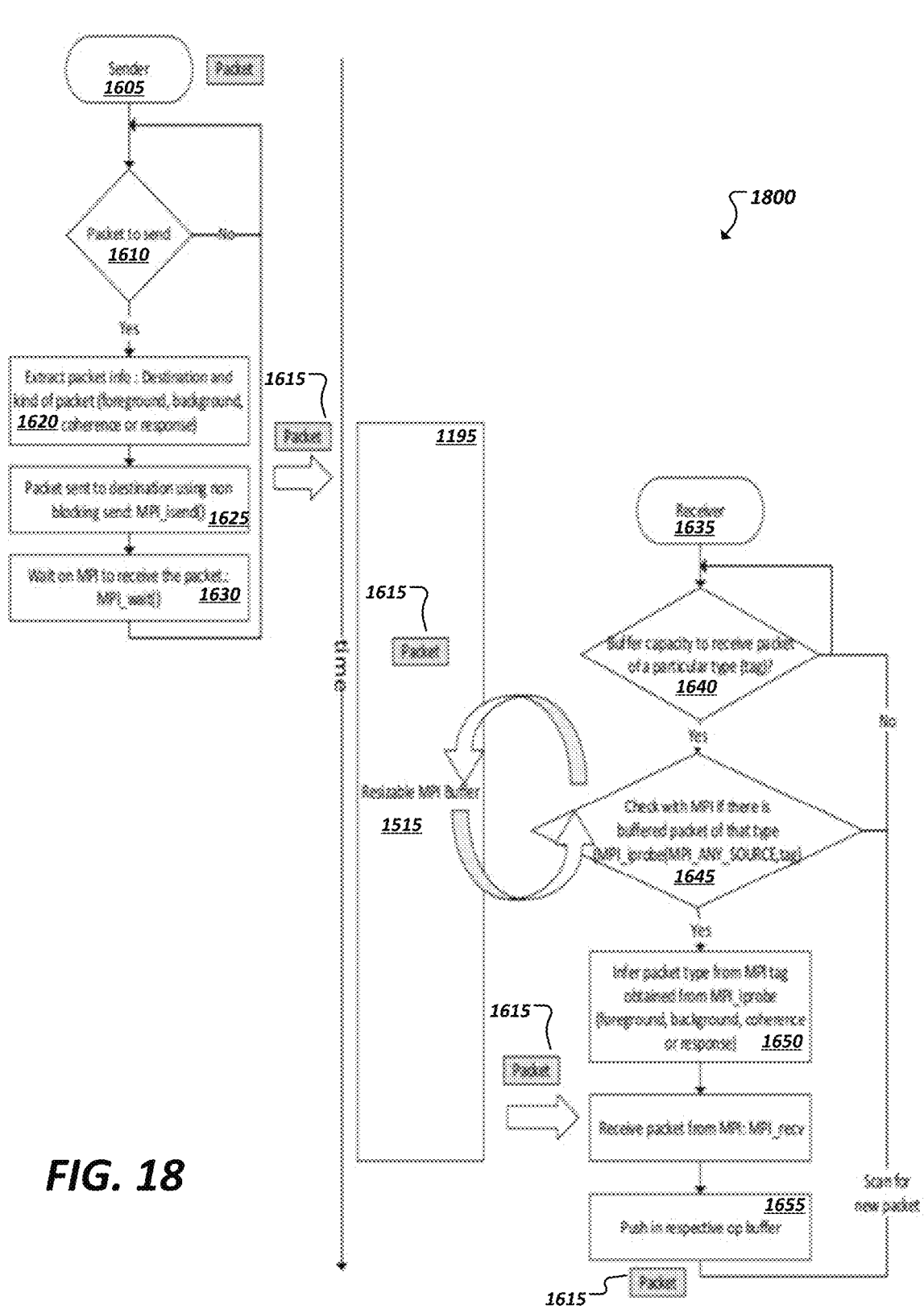
FIG. 18 is a simplified flow diagram illustrating performance of an improved no-query push-based network flow control technique using MPI.

While FIGS. 15 and 16 present a more generalized introduction to the implementation of an example no-query push-based flow control scheme, a variety of specific technologies may be utilized to implement such a scheme, such as various simulator platforms, communication runtimes (TCP/IP (Unix Socket), Message Passing Interface (MPI), InfiniBand™, Lightweight Communication Interface (LCI), etc.), message protocols, etc. Indeed, a variety of alternative tools, technologies, and protocols may be utilized to implement the generalized principles outlined above. As one specific illustrative example, MPI and an MPI-based communication runtime may be utilized to implement the communication runtime for a system simulator. FIG. 17 presents a simplified block diagram 1700 illustrating a more specific implementation of the block diagram illustrated in FIG. 15, with the example of FIG. 17 illustrating the use of an MPI-based communication runtime. Similarly, FIG. 18 presents a more specific implementation of the flow diagram illustrated in FIG. 16, the flow diagram 1800 of FIG. 18 identifying specific MPI distributed communication library calls and semantics that may be adopted in a specific, MPI-based implementation of the flow control scheme (e.g., using MPI_isend( ), MPI_wait( ), MPI_iprobe( ), MPI_recv( ), etc. as illustrated in FIG. 18). Other examples (not explicitly illustrated) may similarly implement such a flow control scheme utilizing other (non-MPI) technologies, distributed communication libraries, and interfaces.

As noted above, with a query-based scheme in a realistic scenario, at times the sender might be required to perform multiple queries to check the buffer capacity of the receiver before it can send the packet. This will further worsen when simulating workloads that are communication or memory intensive workload, such as graph analytics, sparse artificial intelligence (AI), databases, machine learning, etc. Mathematically, query based schemes may require a minimum of three send( ) calls (e.g., one send( ) by the sender to query buffer capacity of receiver, one send ( ) by the receiver to communicate buffer capacity to the sender, and one send( ) to actually send the packet). Conversely, the example no-query push-based flow control scheme illustrated in the examples above may utilize only a single send( ) call. This equates to a minimum 3× simulation performance gain. When compared to the credit-based scheme, the proposed scheme saves a broadcast call (e.g., MPI_bcast) per packet being received, which theoretically would result in at least a 2× simulation performance gain (e.g., as MPI_bcast generates significant network traffic by sending a credit update request to all senders upon reception of any packet) in the system, and generally tends to be more expensive compared to standard send calls (e.g., MPI_Send)). In one example, a no-query push scheme accelerated large scale simulations by more than 3-4× on average for a suite of graph and sparse AI workloads, and scaled well with size of machine being simulated, among other example applications and benefits.

Figure 19:
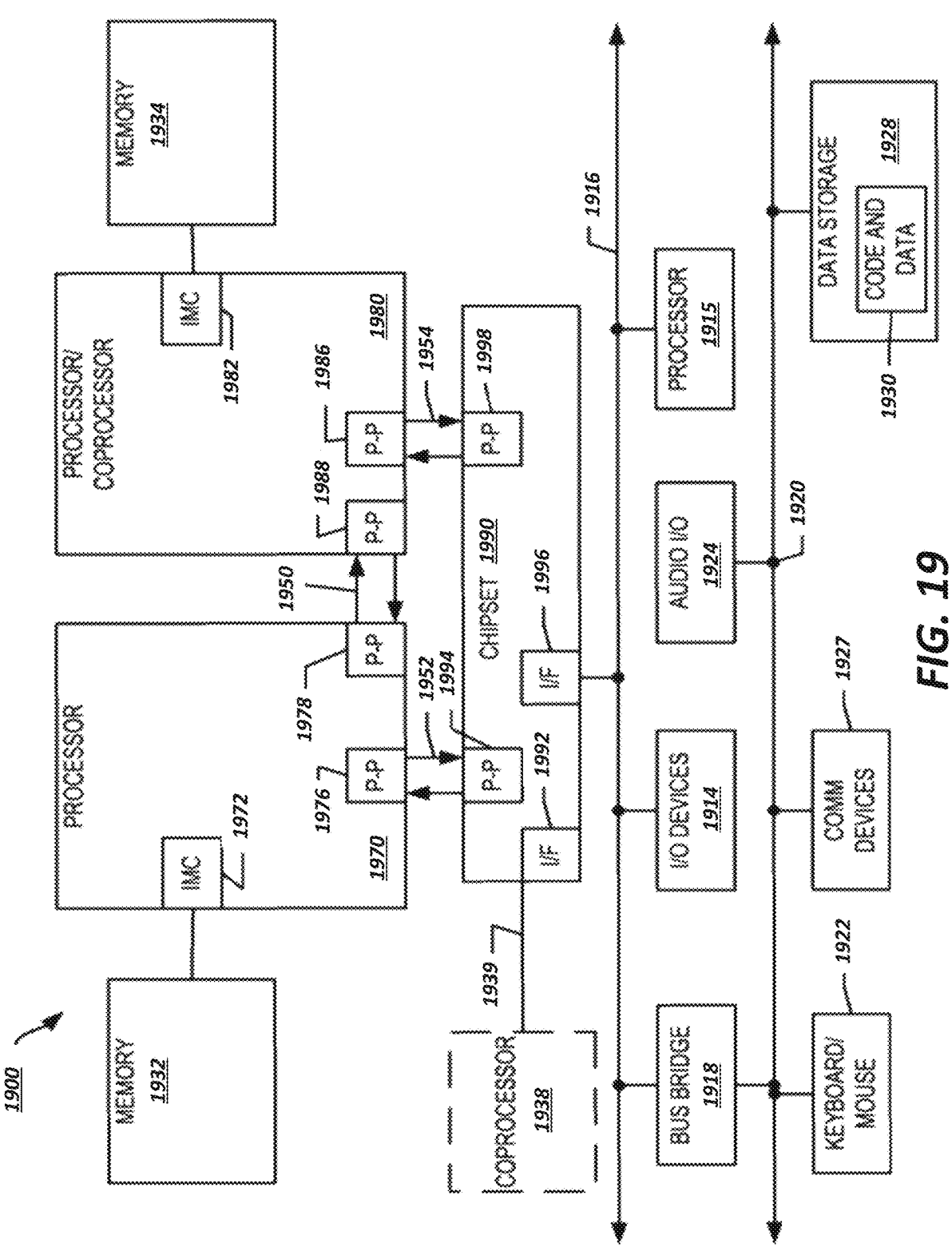
FIG. 19 is a block diagram of a more specific exemplary system.

Referring now to FIG. 19, shown is a block diagram of a first more specific exemplary system 1900 in accordance with an embodiment of the present disclosure. As shown in FIG. 19, multiprocessor system 1900 is a point-to-point interconnect system, and includes a first processor 1970 and a second processor 1980 coupled via a point-to-point interconnect 1950. In one embodiment first and second processor may be two interconnect graph processor devices, two dense processor device, or a graph processor device coupled to a dense processor device, among other examples.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet is connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present disclosure is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
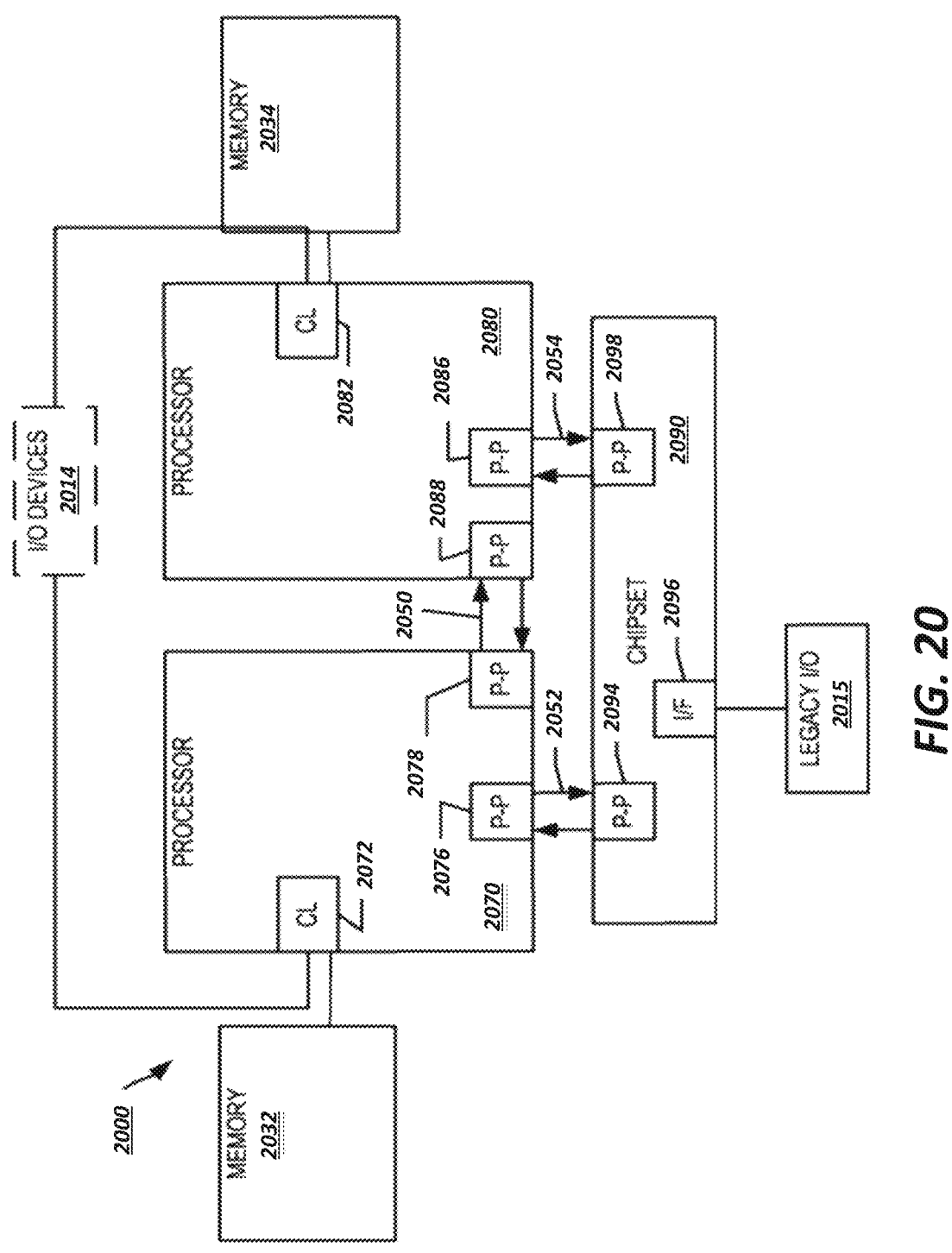
FIG. 20 is a block diagram of a second more specific exemplary system.

Referring now to FIG. 20, shown is a block diagram of a second more specific exemplary system 2000 in accordance with an embodiment of the present disclosure. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL")

1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
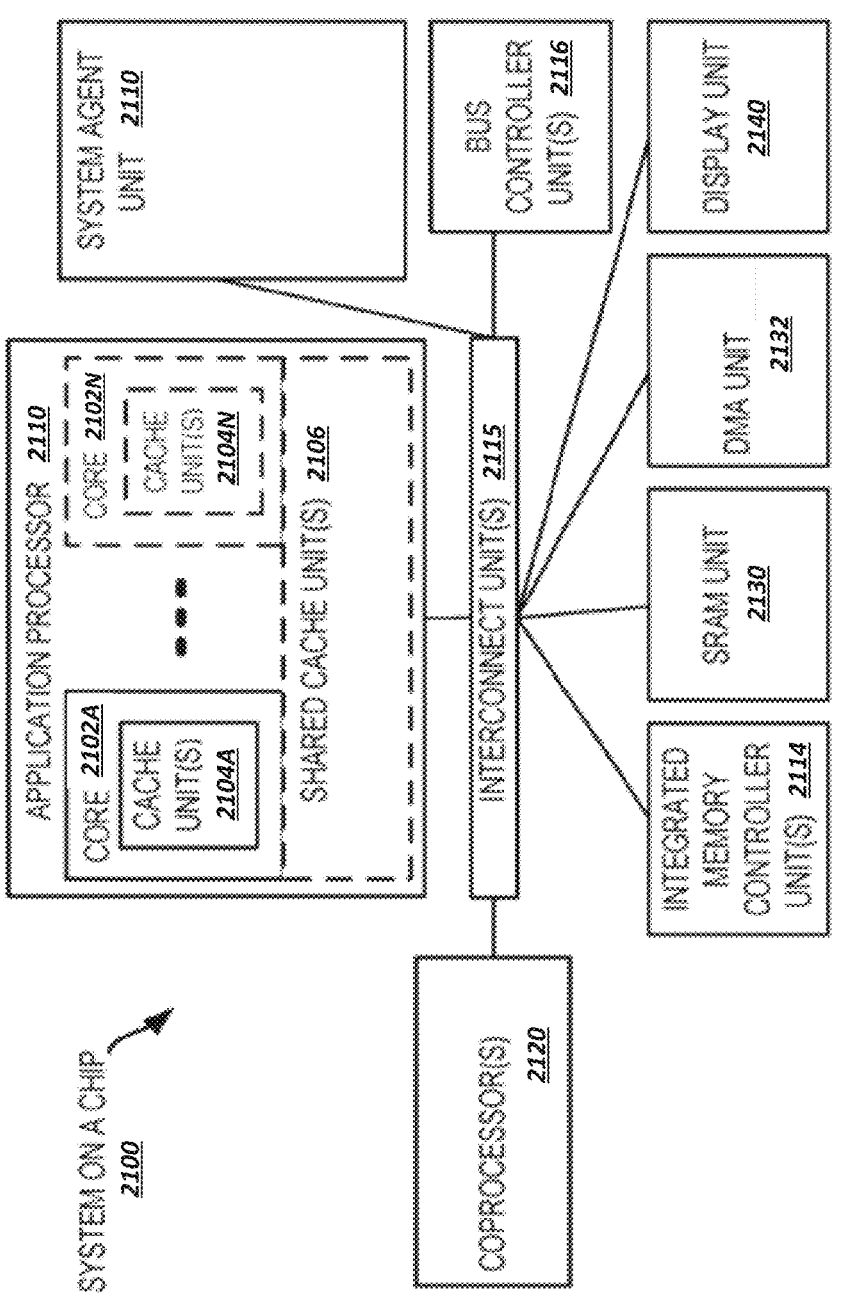
FIG. 21 is a block diagram of a system on a chip (SoC).

Referring now to FIG. 21, shown is a block diagram of a SoC 2100 in accordance with an embodiment of the present disclosure. Also, dashed lined boxes are optional features on more advanced SoCs. In FIG. 21, an interconnect unit(s) 2115 is coupled to: an application processor 2110 which includes a set of one or more cores 2102A-N and shared cache unit(s) 2106; a system agent unit 2110; a bus controller unit(s) 2116; an integrated memory controller unit(s) 2114; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems including at least one processor, a storage system (including volatile and non-volatile memory and/or storage elements), at least one input device, and at least one output device.

Program code, such as code 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

"Logic" (e.g., as found in offload engines, memory managers, memory controllers, network controllers, etc. and other references to logic in this application) may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software-based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 418A0 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

It should be appreciated that logic, engines, components, and modules, as discussed above, may be implemented entirely in hardware circuitry, firmware, or software. In other instances, logic, engines, modules, and components may be implemented through a combination of hardware circuitry, firmware, or software. In some cases, components described as implemented at least partially in hardware may be emulated or simulated in hardware, such as in a system simulator, among other example implementations.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is a non-transitory machine readable storage medium with instructions stored thereon, the instructions executable to cause a machine to: simulate a first device coupled to a second device by a physical link in a simulation of a computing system; identify a packet generated by a simulation of the first device to be sent from the first device to the second device in the simulation, where the packet is to be sent through a communication runtime in the simulation; buffer the packet in an internal buffer of the communication runtime; receive, at the communication runtime, a query from a simulation of the second device, where the query identifies that a receive buffer of the simulation of the second device has capacity; and send the packet from the communication runtime buffer to the simulation of the second device based on the query to simulate transmission of the packet from the first device to the second device on the link.

Example 2 includes the subject matter of example 1, where the simulation of the first device is implemented by a first software model, the simulation of the second device is implemented by a second software model, and the communication runtime includes a library of messages callable by the first and second software models to facilitate simulation of communication between the first device and the second device.

Example 3 includes the subject matter of any one of examples 1-2, where the computing system includes a data center-scale cluster of computing devices.

Example 4 includes the subject matter of any one of examples 1-3, where the internal buffer is used to simulate flow control provided on the link in the simulation.

Example 5 includes the subject matter of example 4, where a real-world version of the physical link is to utilize a different flow control scheme.

Example 6 includes the subject matter of any one of examples 1-5, where the instructions, when executed, further cause the machine to send an acknowledgement of receipt of the packet by the communication runtime to the simulation of the first device.

Example 7 includes the subject matter of example 6, where the simulation of the first device includes a simulation of a transmit buffer of the first device, and the simulation of the transmit buffer of the first device is to hold the packet until the acknowledgement is received from the communication runtime.

Example 8 includes the subject matter of any one of examples 1-7, where the receive buffer of the simulation of the second device simulates a receive buffer of the second device, the transmit buffer of the first device and the receive buffer of the second device have fixed respective sizes, and the internal buffer of the communication runtime is dynamically resizable.

Example 9 includes the subject matter of any one of examples 1-8, where at least one of the first device or the second device includes a multithreaded pipeline.

Example 10 includes the subject matter of example 9, where the first device or the second device includes a graph processing core.

Example 11 includes the subject matter of any one of examples 9-10, where the simulation simulates a system including a plurality of interconnected multithreaded computing devices.

Example 12 includes the subject matter of any one of examples 1-11, where the instructions, when executed, further cause the machine to: send a response to the query to the simulation of the second device from the communication runtime, where the response identifies the packet; and receive, from the simulation of the second device, a request to send the packet from the communication runtime to the simulation of the second device.

Example 13 includes the subject matter of any one of examples 1-12, where the instructions, when executed, further cause the machine to: receive an acknowledgement from the simulation of the second device that the packet is received; and reclaim an entry in the internal buffer used to buffer the packet based on the acknowledgement.

Example 14 is a method including: simulating a first device coupled to a second device by a physical link in a simulation of a computing system; identifying a packet generated by a simulation of the first device to be sent from the first device to the second device in the simulation, where the packet is to be sent through a communication runtime in the simulation; buffering the packet in an internal buffer of the communication runtime; receiving, at the communication runtime, a query from a simulation of the second device, where the query identifies that a receive buffer of the simulation of the second device has capacity; and sending the packet from the communication runtime buffer to the simulation of the second device based on the query to simulate transmission of the packet from the first device to the second device on the link.

Example 15 includes the subject matter of example 14, where the simulation of the first device is implemented by a first software model, the simulation of the second device is implemented by a second software model, and the communication runtime includes a library of messages callable by the first and second software models to facilitate simulation of communication between the first device and the second device.

Example 16 includes the subject matter of any one of examples 14-15, where the computing system includes a data center-scale cluster of computing devices.

Example 17 includes the subject matter of any one of examples 14-16, where the internal buffer is used to simulate flow control provided on the link in the simulation.

Example 18 includes the subject matter of example 17, where a real-world version of the physical link is to utilize a different flow control scheme.

Example 19 includes the subject matter of any one of examples 14-18, further including sending an acknowledgement of receipt of the packet by the communication runtime to the simulation of the first device.

Example 20 includes the subject matter of example 19, where the simulation of the first device includes a simulation of a transmit buffer of the first device, and the simulation of the transmit buffer of the first device is to hold the packet until the acknowledgement is received from the communication runtime.

Example 21 includes the subject matter of any one of examples 14-20, where the receive buffer of the simulation of the second device simulates a receive buffer of the second device, the transmit buffer of the first device and the receive buffer of the second device have fixed respective sizes, and the internal buffer of the communication runtime is dynamically resizable.

Example 22 includes the subject matter of any one of examples 14-21, where at least one of the first device or the second device includes a multithreaded pipeline.

Example 23 includes the subject matter of example 22, where the first device or the second device includes a graph processing core.

Example 24 includes the subject matter of any one of examples 22-23, where the simulation simulates a system including a plurality of interconnected multithreaded computing devices.

Example 25 includes the subject matter of any one of examples 14-24, further including: sending a response to the query to the simulation of the second device from the communication runtime, where the response identifies the packet; and receiving, from the simulation of the second device, a request to send the packet from the communication runtime to the simulation of the second device.

Example 26 includes the subject matter of any one of examples 14-25, further including: receiving an acknowledgement from the simulation of the second device that the packet is received; and reclaiming an entry in the internal buffer used to buffer the packet based on the acknowledgement.

Example 27 is a system including means to perform the method of any one of examples 14-25.

Example 28 is a non-transitory machine readable storage medium with instructions stored thereon, the instructions executable to cause a machine to: emulate operation of a first hardware device in a first device model to be included in a computing system, where the first device model includes a fixed-size receive buffer; monitor the receive buffer in the first device model to determine whether capacity exists in the receive buffer to receive a new packet; send a query to a communication runtime to determine whether any packets destined for the first device model are buffered in an internal buffer of the communication runtime, where the communication runtime facilitates communication between a plurality of device models; receive a response to the query from the communication runtime, where the response identifies a particular packet stored in the internal buffer of the communication runtime for the first device model, the particular packet was delivered to the communication runtime by a second device model, and the second device model emulates another device in the computing system; receive the particular packet at the first device model from the communication runtime; and process the particular packet at the first device model.

Example 29 includes the subject matter of example 28, where the first device model includes a plurality of receive buffers, each of the plurality of receive buffers is used to buffer packets of a respective one of a plurality of operation types, and the instructions, when executed, further cause the machine to: identify that a particular one of the plurality of operation types corresponds to the particular packet; and store the particular packet in a particular receive buffer in the plurality of receive buffer associated with the particular operation type.

Example 30 includes the subject matter of example 29, where the first device model determines that the particular receive buffer has capacity, and the query indicates the particular operation type associated with the particular receive buffer.

Example 31 includes the subject matter of any one of examples 28-30, where the first hardware device includes a plurality of multithreaded compute pipelines, and the first device model models operation of the first hardware device.

Example 32 includes the subject matter of any one of examples 28-31, where the instructions, when executed, further cause a machine to send an acknowledgement of receipt of the particular packet by the first device model to the communication runtime.

Example 33 includes the subject matter of any one of examples 28-32, where the instructions, when executed, further cause a machine to: send a request for the particular packet to the communication runtime based on the response to the query, where the particular packet is received at the first device model based on the request.

Example 34 is a method including: emulating operation of a first hardware device in a first device model included in a simulation of a computing system, where the first hardware device includes a fixed-size receive buffer; monitoring a simulated version of the receive buffer in the first device model to determine whether capacity exists in the simulated version of the receive buffer to receive a new packet; sending a query to a communication runtime to determine whether any packets destined for the first device model are buffered in an internal buffer of the communication runtime, where the communication runtime is used in the simulation to facilitate communication between a plurality of device models used to model a plurality of real world devices in the simulation; receiving a response to the query from the communication runtime, where the response identifies a particular packet stored in the internal buffer of the communication runtime for the first device model, the particular packet was delivered to the communication runtime by a second device model in the simulation, and the second device model simulates another device in the computing system; receiving the particular packet at the first device model from the communication runtime; and processing the particular packet at the first device model.

Example 35 includes the subject matter of example 34, where the first device includes a plurality of receive buffers, each of the plurality of receive buffers is used to buffer packets of a respective one of a plurality of operation types, and the method further includes: identifying that a particular one of the plurality of operation types corresponds to the particular packet; and storing the particular packet in a particular receive buffer in the plurality of receive buffer associated with the particular operation type.

Example 36 includes the subject matter of example 35, where the first device model determines that the particular receive buffer has capacity, and the query indicates the particular operation type associated with the particular receive buffer.

Example 37 includes the subject matter of any one of examples 34-36, where the first hardware device includes a plurality of multithreaded compute pipelines, and the first device model models operation of the first hardware device.

Example 38 includes the subject matter of any one of examples 34-37, further including sending an acknowledgement of receipt of the particular packet by the first device model to the communication runtime.

Example 39 includes the subject matter of any one of examples 34-38, further including sending a request for the particular packet to the communication runtime based on the response to the query, where the particular packet is received at the first device model based on the request.

Example 40 is a system including means to perform the method of any one of examples 34-39.

Example 41 is a system including: a processor; a memory; and a system simulator executable by the processor to simulate operations of a plurality of interconnected devices in a simulation of a computing system, where the system simulator is to implement a communication runtime in the simulation, and the communication runtime is to: receive a packet generated by a simulation of a first one of the plurality of devices to be sent to a simulation of a second one of the plurality of devices in the simulation; buffer the packet in an internal buffer of the communication runtime; receive, at the communication runtime, a query from the simulation of the second device, where the query identifies that a receive buffer of the simulation of the second device has capacity, and the receive buffer of the simulation of the second device is to simulate a fixed-size buffer of the second device; and send the packet from the communication runtime buffer to the simulation of the second device based on the query to simulate transmission of the packet from the first device to the second device on a link.

Example 42 includes the subject matter of example 41, where the system simulator is further executable to implement the simulation of the first device and the simulation of the second device.

Example 43 includes the subject matter of example 42, where the simulation of the first device is to initiate sending of the packet to the second device without regard to whether capacity exists in receive buffers of the simulation of the second device.

Example 44 includes the subject matter of any one of examples 41-43, where the computing system includes a data center-scale cluster of computing devices.

Example 45 includes the subject matter of any one of examples 41-44, where the internal buffer is used to simulate flow control provided on the link in the simulation.

Example 46 includes the subject matter of example 45, where a real-world version of the physical link is to utilize a different flow control scheme.

Example 47 includes the subject matter of any one of examples 41-46, where the communication runtime is further to send an acknowledgement of receipt of the packet by the communication runtime to the simulation of the first device.

Example 48 includes the subject matter of example 47, where the simulation of the first device includes a simulation of a transmit buffer of the first device, and the simulation of the transmit buffer of the first device is to hold the packet until the acknowledgement is received from the communication runtime.

Example 49 includes the subject matter of any one of examples 41-48, where the receive buffer of the simulation of the second device simulates a receive buffer of the second device, the transmit buffer of the first device and the receive buffer of the second device have fixed respective sizes, and the internal buffer of the communication runtime is dynamically resizable.

Example 50 includes the subject matter of any one of examples 41-49, where at least one of the first device or the second device includes a multithreaded pipeline.

Example 51 includes the subject matter of example 50, where the first device or the second device includes a graph processing core.

Example 52 includes the subject matter of any one of examples 50-51, where the simulation simulates a system including a plurality of interconnected multithreaded computing devices.

Example 53 includes the subject matter of any one of examples 41-52, where the communication runtime is further to: send a response to the query to the simulation of the second device from the communication runtime, where the response identifies the packet; and receive, from the simulation of the second device, a request to send the packet from the communication runtime to the simulation of the second device.

Example 54 includes the subject matter of any one of examples 41-53, where the instructions, when executed, further cause the machine to: receive an acknowledgement from the simulation of the second device that the packet is received; and reclaim an entry in the internal buffer used to buffer the packet based on the acknowledgement.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. At least one non-transitory machine readable storage medium with instructions stored thereon, the instructions executable to cause a machine to:

simulate a first device coupled to a second device by a physical link in a simulation of a computing system;

identify a packet generated by a simulation of the first device to be sent from the first device to the second device in the simulation, wherein the packet is to be sent through a communication runtime used to emulate the physical link in the simulation, and wherein the internal buffer is used to simulate flow control provided on the link in the simulation;

buffer the packet in an internal buffer of the communication runtime, wherein the internal buffer is dynamically resizable to accommodate the simulation;

receive, at the communication runtime, a query from a simulation of the second device, wherein the query identifies that a receive buffer of the simulation of the second device has capacity; and send the packet from the communication runtime buffer to the simulation of the second device based on the query to simulate transmission of the packet from the first device to the second device on the link.

2. The storage medium of claim 1, wherein the simulation of the first device is implemented by a first software model, the simulation of the second device is implemented by a second software model, and the communication runtime comprises a library of messages callable by the first and second software models to facilitate simulation of communication between the first device and the second device.

3. The storage medium of claim 1, wherein the computing system comprises a data center-scale cluster of computing devices.

4. The storage medium of claim 1, wherein the internal buffer is to implement a no-query push flow control scheme.

5. The storage medium of claim 1, wherein a real-world version of the physical link is to utilize a different flow control scheme than implemented through the internal buffer.

6. The storage medium of claim 1, wherein the instructions, when executed, further cause the machine to send an acknowledgement of receipt of the packet by the communication runtime to the simulation of the first device.

7. The storage medium of claim 6, wherein the simulation of the first device comprises a simulation of a transmit buffer of the first device, and the simulation of the transmit buffer of the first device is to hold the packet until the acknowledgement is received from the communication runtime.

8. The storage medium of claim 1, wherein the receive buffer of the simulation of the second device simulates a receive buffer of the second device, and the transmit buffer of the first device and the receive buffer of the second device have fixed respective sizes.

9. The storage medium of claim 1, wherein at least one of the first device or the second device comprises a multi-threaded pipeline.

10. The storage medium of claim 9, wherein the first device or the second device comprises a graph processing circuitry.

11. The storage medium of claim 9, wherein the simulation simulates a system comprising a plurality of interconnected multithreaded computing devices.

12. The storage medium of claim 1, where the instructions, when executed, further cause the machine to:
send a response to the query to the simulation of the second device from the communication runtime, wherein the response identifies the packet;
receive, from the simulation of the second device, a request to send the packet from the communication runtime to the simulation of the second device.

13. The storage medium of claim 1, where the instructions, when executed, further cause the machine to:
receive an acknowledgement from the simulation of the second device that the packet is received; and
reclaim an entry in the internal buffer used to buffer the packet based on the acknowledgement.

14. At least one non-transitory machine readable storage medium with instructions stored thereon, the instructions executable to cause a machine to:
emulate operation of a first hardware device in a simulation of a computing system, wherein the first hardware device is emulated through a first device model to be included in the computing system, wherein the first device model comprises a fixed-size receive buffer;
monitor a receive buffer in the first device model to determine whether capacity exists in the receive buffer to receive a new packet;
send a query to a communication runtime to determine whether any packets destined for the first device model are buffered in an internal buffer of the communication runtime, wherein the communication runtime is used to implement the simulation and facilitates communication between a plurality of device models;
receive a response to the query from the communication runtime, wherein the response identifies a particular packet stored in the internal buffer of the communication runtime for the first device model, the particular packet was delivered to the communication runtime by a second device model, and the second device model emulates another device in the computing system;
receive the particular packet at the first device model from the communication runtime; and
process the particular packet at the first device model.

15. The storage medium of claim 14, wherein the first device model comprises a plurality of receive buffers, each of the plurality of receive buffers is used to buffer packets of a respective one of a plurality of operation types, and the instructions, when executed, further cause the machine to:
identify that a particular one of the plurality of operation types corresponds to the particular packet;
store the particular packet in a particular receive buffer in the plurality of receive buffer associated with the particular operation type.

16. The storage medium of claim 15, wherein the first device model determines that the particular receive buffer has capacity, and the query indicates the particular operation type associated with the particular receive buffer.

17. The storage medium of claim 14, wherein the first hardware device comprises a plurality of multithreaded compute pipelines, and the first device model models operation of the first hardware device.

18. A system comprising:
a processor;
a memory; and
a system simulator executable by the processor to simulate operations of a plurality of interconnected devices in a simulation of a computing system, wherein the system simulator is to implement a communication runtime in the simulation to implement simulated communications between the plurality of interconnect devices in the simulation, and the communication runtime is to:
receive a packet generated by a simulation of a first one of the plurality of devices to be sent to a simulation of a second one of the plurality of devices in the simulation;
buffer the packet in an internal buffer of the communication runtime;
receive, at the communication runtime, a query from the simulation of the second device, wherein the query identifies that a receive buffer of the simulation of the second device has capacity, and the receive buffer of the simulation of the second device is to simulate a fixed-size buffer of the second device; and
send the packet from the internal buffer of the communication runtime to the simulation of the second device based on the query to simulate transmission of the packet from the first device to the second device on a link.

19. The system of claim 18, wherein the system simulator is further executable to implement the simulation of the first device and the simulation of the second device.

20. The system of claim 19, wherein the simulation of the first device is to initiate sending of the packet to the second device without regard to whether capacity exists in receive buffers of the simulation of the second device.

* * * * *